US011218253B2

(12) United States Patent
Stern-Berkowitz et al.

(10) Patent No.: US 11,218,253 B2
(45) Date of Patent: Jan. 4, 2022

(54) METHODS AND PROCEDURES FOR NARROWBAND LTE OPERATION

(71) Applicant: INTERDIGITAL PATENT HOLDINGS, INC., Wilmington, DE (US)

(72) Inventors: Janet A. Stern-Berkowitz, Little Neck, NY (US); Moon-il Lee, Melville, NY (US); Sungkwon Hong, Dongjak-gu (KR)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/771,886

(22) PCT Filed: Nov. 4, 2016

(86) PCT No.: PCT/US2016/060500
§ 371 (c)(1),
(2) Date: Apr. 27, 2018

(87) PCT Pub. No.: WO2017/079539
PCT Pub. Date: May 11, 2017

(65) Prior Publication Data
US 2018/0316464 A1 Nov. 1, 2018

Related U.S. Application Data

(60) Provisional application No. 62/307,856, filed on Mar. 14, 2016, provisional application No. 62/290,630, (Continued)

(51) Int. Cl.
*H04L 12/801* (2013.01)
*H04L 5/14* (2006.01)
(Continued)

(52) U.S. Cl.
CPC .......... *H04L 1/1657* (2013.01); *H04L 1/0034* (2013.01); *H04L 1/1692* (2013.01);
(Continued)

(58) Field of Classification Search
CPC ... H04L 1/1657; H04L 1/0034; H04L 1/1692; H04L 1/1812; H04L 5/0055; H04W 72/042
See application file for complete search history.

(56) References Cited

U.S. PATENT DOCUMENTS 8,533,553 B2   9/2013   Yang et al.
8,670,379 B2   3/2014   Yamada et al.
(Continued)

FOREIGN PATENT DOCUMENTS

CN   102365837 A   2/2012
CN   103493417 A   1/2014
(Continued)

OTHER PUBLICATIONS

3rd Generation Partnership Project (3GPP), R1-071488, "Uplink Transmission of ACK/NAK Signals", Texas Instruments, 3GPP TSG RAN WG1 #48bis, St. Julians, Malta, Mar. 26-30, 2007, 6 pages.
(Continued)

*Primary Examiner* — Faruk Hamza
*Assistant Examiner* — Abusayeed M Haque
(74) *Attorney, Agent, or Firm* — Condo Roccia Koptiw LLP

(57) ABSTRACT

Systems, methods, and instrumentalities are disclosed for narrowband (NB) LTE operation. A WTRU may receive a first downlink data transmission, for example, via a physical downlink shared channel (PDSCH). The WTRU may determine to send a hybrid automatic repeat request (HARQ) acknowledgment (ACK) in response to receipt of the first
(Continued)

downlink data transmission. The WTRU may transmit a first uplink reference signal. The WTRU may indicate the HARQ-ACK using a first cyclic shift index that is applied to the first uplink reference signal. The WTRU may determine to send a HARQ negative ACK (HARQ-NACK), for example, on a condition that a second downlink data transmission is not correctly received. The WTRU may send a second uplink reference signal. The WTRU may indicate the HARQ-NACK using a second cyclic shift that is applied to the second uplink reference signal.

17 Claims, 22 Drawing Sheets

Related U.S. Application Data filed on Feb. 3, 2016, provisional application No. 62/272,835, filed on Dec. 30, 2015, provisional application No. 62/250,798, filed on Nov. 4, 2015.

(51) Int. Cl.

| | | |
|---|---|---|
| *H04W 84/18* | (2009.01) | |
| *H04L 1/00* | (2006.01) | |
| *H04L 1/16* | (2006.01) | |
| *H04L 1/18* | (2006.01) | |
| *H04W 72/04* | (2009.01) | |
| *H04L 5/00* | (2006.01) | |

(52) U.S. Cl.
CPC .......... *H04L 1/1812* (2013.01); *H04W 72/042* (2013.01); *H04L 5/0007* (2013.01); *H04L 5/0055* (2013.01)

(56) References Cited

U.S. PATENT DOCUMENTS

| | | | |
|---|---|---|---|
| 8,976,660 B2 | 3/2015 | Kang et al. | |
| 9,554,374 B2 | 1/2017 | Han et al. | |
| 9,565,008 B2 | 2/2017 | Ko et al. | |
| 9,608,791 B2 | 3/2017 | Choi et al. | |
| 9,629,152 B2 | 4/2017 | Han et al. | |
| 9,742,545 B2 | 8/2017 | Kwon et al. | |
| 9,781,738 B2 | 10/2017 | Pietraski et al. | |
| 9,800,394 B2 | 10/2017 | Yang et al. | |
| 9,854,575 B2 | 12/2017 | Yang et al. | |
| 9,986,551 B2 | 5/2018 | Takeda et al. | |
| 10,368,342 B2 | 7/2019 | Nayeb Nazar et al. | |
| 2008/0045141 A1 | 2/2008 | Suga | |
| 2008/0075184 A1* | 3/2008 | Muharemovic | H04L 5/0053 375/260 |
| 2010/0232382 A1* | 9/2010 | Gauvreau | H04W 72/0413 370/329 |
| 2010/0331037 A1 | 12/2010 | Jen | |
| 2011/0007674 A1 | 1/2011 | Dai et al. | |
| 2011/0116436 A1 | 5/2011 | Bachu et al. | |
| 2011/0116457 A1* | 5/2011 | Damnjanovic | H04L 1/1861 370/329 |
| 2011/0141941 A1 | 6/2011 | Lee et al. | |
| 2011/0170489 A1 | 7/2011 | Han et al. | |
| 2011/0243066 A1 | 10/2011 | Nayeb Nazar et al. | |
| 2012/0250742 A1* | 10/2012 | Tiirola | H04B 7/0404 375/219 |
| 2013/0039387 A1* | 2/2013 | Qu | H04L 5/0023 375/141 |
| 2013/0044664 A1 | 2/2013 | Nory et al. | |
| 2013/0077569 A1* | 3/2013 | Nam | H04W 52/288 370/328 |
| 2013/0083742 A1 | 4/2013 | Baldemair et al. | |
| 2013/0142142 A1* | 6/2013 | McBeath | H04L 5/003 370/329 |
| 2013/0176930 A1* | 7/2013 | Lee | H04W 28/0278 370/312 |
| 2013/0288738 A1 | 10/2013 | Takeda et al. | |
| 2014/0044090 A1* | 2/2014 | Beale | H04W 72/04 370/330 |
| 2014/0086197 A1 | 3/2014 | Yang et al. | |
| 2014/0092856 A1 | 4/2014 | Yang et al. | |
| 2014/0269595 A1 | 9/2014 | Lee et al. | |
| 2014/0286281 A1 | 9/2014 | Jang et al. | |
| 2014/0301324 A1* | 10/2014 | Cheng | H04L 5/0055 370/329 |
| 2015/0131605 A1 | 5/2015 | Nogami et al. | |
| 2015/0146588 A1 | 5/2015 | Park | |
| 2015/0256308 A1 | 9/2015 | Ma et al. | |
| 2015/0295681 A1 | 10/2015 | Liang et al. | |
| 2015/0358111 A1 | 12/2015 | Marinier et al. | |
| 2015/0358132 A1 | 12/2015 | Wallen et al. | |
| 2016/0095105 A1* | 3/2016 | Chen | H04L 5/0053 370/329 |
| 2016/0105264 A1 | 4/2016 | Chen et al. | |
| 2016/0127097 A1 | 5/2016 | Chen et al. | |
| 2016/0164643 A1* | 6/2016 | Loehr | H04L 1/1854 370/336 |
| 2016/0174204 A1 | 6/2016 | Yang et al. | |
| 2016/0192376 A1* | 6/2016 | Lee | H04W 72/0406 370/252 |
| 2016/0242207 A1 | 8/2016 | Yasukawa et al. | |
| 2016/0249359 A1 | 8/2016 | Yamazaki et al. | |
| 2016/0359591 A1* | 12/2016 | Yellapantula | H04W 24/06 |
| 2017/0013565 A1 | 1/2017 | Pelletier et al. | |
| 2017/0078058 A1* | 3/2017 | Marinier | H04W 72/042 |
| 2017/0164335 A1 | 6/2017 | Yamamoto et al. | |
| 2017/0164350 A1 | 6/2017 | Sun et al. | |
| 2017/0251493 A1 | 8/2017 | Zhang | |
| 2017/0288962 A1* | 10/2017 | Yi | H04W 74/0808 |
| 2017/0290008 A1* | 10/2017 | Tooher | H04L 1/1893 |
| 2017/0303283 A1 | 10/2017 | Ng et al. | |
| 2018/0076917 A1 | 3/2018 | Pan et al. | |
| 2018/0213530 A1 | 7/2018 | Mochizuki et al. | |
| 2019/0007175 A1 | 1/2019 | Kwak et al. | |
| 2019/0312669 A1 | 10/2019 | Kwak et al. | |
| 2019/0342135 A1 | 11/2019 | Kwak et al. | |

FOREIGN PATENT DOCUMENTS

| | | |
|---|---|---|
| JP | 2013-527675 A | 6/2013 |
| JP | 2013-240069 A | 11/2013 |
| JP | 2014-096805 A | 5/2014 |
| JP | 2014-527344 A | 10/2014 |
| JP | 2014-534787 A | 12/2014 |
| JP | 2016-511988 A | 4/2016 |
| JP | 2017-022726 A | 1/2017 |
| KR | 10-2010-0130138 A | 12/2010 |
| KR | 10-2011-0090784 A | 8/2011 |
| KR | 10-2011-0120807 A | 11/2011 |
| RU | 2518966 C1 | 6/2014 |
| WO | 2013/051983 A1 | 4/2013 |
| WO | WO 2013/071486 A1 | 5/2013 |
| WO | 2014/049917 A1 | 4/2014 |
| WO | 2017/026159 A1 | 2/2017 |

OTHER PUBLICATIONS

3rd Generation Partnership Project (3GPP), R1-071676, "Data-Non-Associated Control Signal Transmission without UL Data", Nokia, Siemens, 3GPP TSG RAN WG1 Meeting #48bis, St Julian's, Malta, Mar. 26-30, 2007, 6 pages.

3rd Generation Partnership Project (3GPP), R1-071677, "Performance of ACK/NACK Signalling with CDM Multiplexing in LTE UL (FDD)", Nokia, Siemens, 3GPP TSG RAN WG1 Meeting #48bis, St Julian's, Malta, Mar. 26-30, 2007 2 pages.

3rd Generation Partnership Project (3GPP), R1-082374, "DTX Detection of ACK/NAK transmitted in PUSCH", ZTE, 3GPP TSG RAN WG1 Meeting #53bis, Warsaw, Poland, Jun. 30-Jul. 4, 2008, 2 pages.

(56) References Cited

OTHER PUBLICATIONS

3rd Generation Partnership Project (3GPP), R1-151338, "PHICH for Rel-13 Low Complexity UEs", CATT, 3GPP TSG RAN WG1 Meeting #80bis, Belgrade, Serbia, Apr. 20-24, 2015, 1 page.

3rd Generation Partnership Project (3GPP), R1-155538, "HARQ-ACK Codebook Adaptation for CA Enhancement", Ericsson, 3GPP TSG RAN WG1 Meeting #82bis, Malmö, Sweden, Oct. 5-9, 2015, 4 pages.

3rd Generation Partnership Project (3GPP), R1-161928, "Remaining Issues of Reference Signal Design", Samsung, 3GPP TSG RAN WG1 NB-IoT Adhoc Meeting, Sophia Antipolis, France, Mar. 22-24, 2016, 3 pages.

3rd Generation Partnership Project (3GPP), TS 36.211 V12.7.0, "Technical Specification Group Radio Access Network, Evolved Universal Terrestrial Radio Access (E-UTRA), Physical Channels and Modulation (Release 12)", Sep. 2015, 136 pages.

3rd Generation Partnership Project (3GPP), TS 36.212 V12.6.0, "Technical Specification Group Radio Access Network, Evolved Universal Terrestrial Radio Access (E-UTRA), Multiplexing and Channel Coding (Release 12)", Sep. 2015, 95 pages.

3rd Generation Partnership Project (3GPP), TS 36.213 V12.7.0, "Technical Specification Group Radio Access Network, Evolved Universal Terrestrial Radio Access (E-UTRA), Physical Layer Procedures (Release 12)", Sep. 2015, 241 pages.

3rd Generation Partnership Project (3GPP), TS 36.321 V12.7.0, "Technical Specification Group Radio Access Network, Evolved Universal Terrestrial Radio Access (E-UTRA), Medium Access Control (MAC) Protocol Specification (Release 12)", Sep. 2015, 77 pages.

3rd Generation Partnership Project (3GPP), TS 36.331 V12.7.0, "Technical Specification Group Radio Access Network, Evolved Universal Terrestrial Radio Access (E-UTRA), Radio Resource Control (RRC), Protocol Specification (Release 12)", Sep. 2015, 453 pages.

3rd Generation Partnership Project (3GPP), R1-166860, "sPUCCH Design for HARQ-ACK Feedback with Shortened TTI Length", LG Electronics, 3GPP TSG RAN WG1 Meeting#86, Gothenburg, Sweden, Aug. 22-26, 2016, 7 pages.

3rd Generation Partnership Project (3GPP), R1-1704466, "Performance Evaluation on Channel Structure of Short PUCCH for 1 or 2 Bits UCI", MediaTek Inc., 3GPP TSG RAN WG1 Meeting #88bis, Spokane, USA, Apr. 3-7, 2017, 7 pages.

3rd Generation Partnership Project (3GPP), R1-1704750, "Short PUCCH Formats for 1~2 UCI Bits", Intel Corporation, 3GPP TSG RAN WG1 Meeting #88b, Spokane, USA, Apr. 3-7, 2017, pp. 1-3.

* cited by examiner

METHODS AND PROCEDURES FOR NARROWBAND LTE OPERATION

CROSS REFERENCE TO RELATED APPLICATIONS

This application is a National Stage entry under 35 U.S.C. § 371 of Patent Cooperation Treaty Application PCT/US2016/060500, filed 4 Nov. 2016, which claims the benefit of U.S. Provisional Patent Application No. 62/250,798, filed Nov. 4, 2015; U.S. Provisional Patent Application No. 62/272,835, filed Dec. 30, 2015; U.S. Provisional Patent Application No. 62/290,630, filed Feb. 3, 2016, and U.S. Provisional Patent Application No. 62/307,856, filed Mar. 14, 2016; the contents of which are incorporated by reference herein.

BACKGROUND

As wireless communication systems such as Long Term Evolution (LTE) systems mature and their network deployments evolve, network operators would like to reduce the cost of the communication network and/or maintenance of the communication network. Reducing the channel bandwidth and/or data rate used to communicate with one or more devices may reduce the cost of the communication network. For example, a portion of the channel bandwidth rather than the entire channel bandwidth may be supported by the devices in the network and/or by the network itself when communicating with such devices. Wireless communication systems (e.g., such as LTE) may consider a bandwidth reduction for some devices, e.g., such as machine type communication (MTC) devices to some level (e.g., 1.4 MHz). The considered bandwidth reduction level may enable more compatibility with legacy systems and/or reduce the time and/or cost of new design (e.g., since some LTE cells may already support operation with a system bandwidth of 1.4 MHz). Further bandwidth reduction, may be desirable for some devices (e.g., smart watches and alarms) which may reduce costs even further. Further reduction of the bandwidth (e.g., to on the order of 200 kHz) may be implemented. However, complications can arise from attempting to support operation with a reduced bandwidth, for example issues related to compatibility with legacy system operation.

SUMMARY

Systems, methods, and instrumentalities are disclosed for narrowband (NB) LTE operation. NB operation may be used by devices that support operation using a portion of the cell/system bandwidth. For example, a NB device may be configured to operate across using a first bandwidth (e.g., 1.4 MHz, 200 kHz, etc.) in a cell with a transmission bandwidth greater than the first bandwidth (e.g., 10 MHz, 20 MHz, etc.).

A WTRU may receive a first downlink data transmission, for example, via a physical downlink shared channel (PDSCH). The WTRU may determine to send a hybrid automatic repeat request (HARQ) acknowledgment (ACK) in response to receipt of the first downlink data transmission. The WTRU may transmit a first uplink signal (e.g., an uplink reference signal). The WTRU may indicate the HARQ-ACK using a first cyclic shift index of (e.g., that is applied to) a first sequence of the first uplink signal. The first cyclic shift index may be applied over a plurality of reference signals across a plurality of uplink single carrier frequency division multiple access (SC-FDMA) symbols. The first downlink data transmission may be received in a first subframe. The first uplink signal may be sent in a second subframe. The first uplink signal may be an uplink reference signal that corresponds to a demodulation reference signal (DM-RS) or a sounding reference signal (SRS). The first uplink reference signal may be sent via a physical uplink shared channel (PUSCH).

The WTRU may determine to send a HARQ negative ACK (HARQ-NACK), for example, on a condition that a second downlink data transmission is not correctly received. The WTRU may send a second uplink signal (e.g., a second uplink reference signal). The WTRU may indicate the HARQ-NACK using a second cyclic shift of (e.g., that is applied to) a second sequence of the second uplink signal. The first sequence and the second sequence may use the same base sequence. The base sequence may be a Zadoff-Chu Sequence. The first cyclic shift index may be different than the second cyclic shift index.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
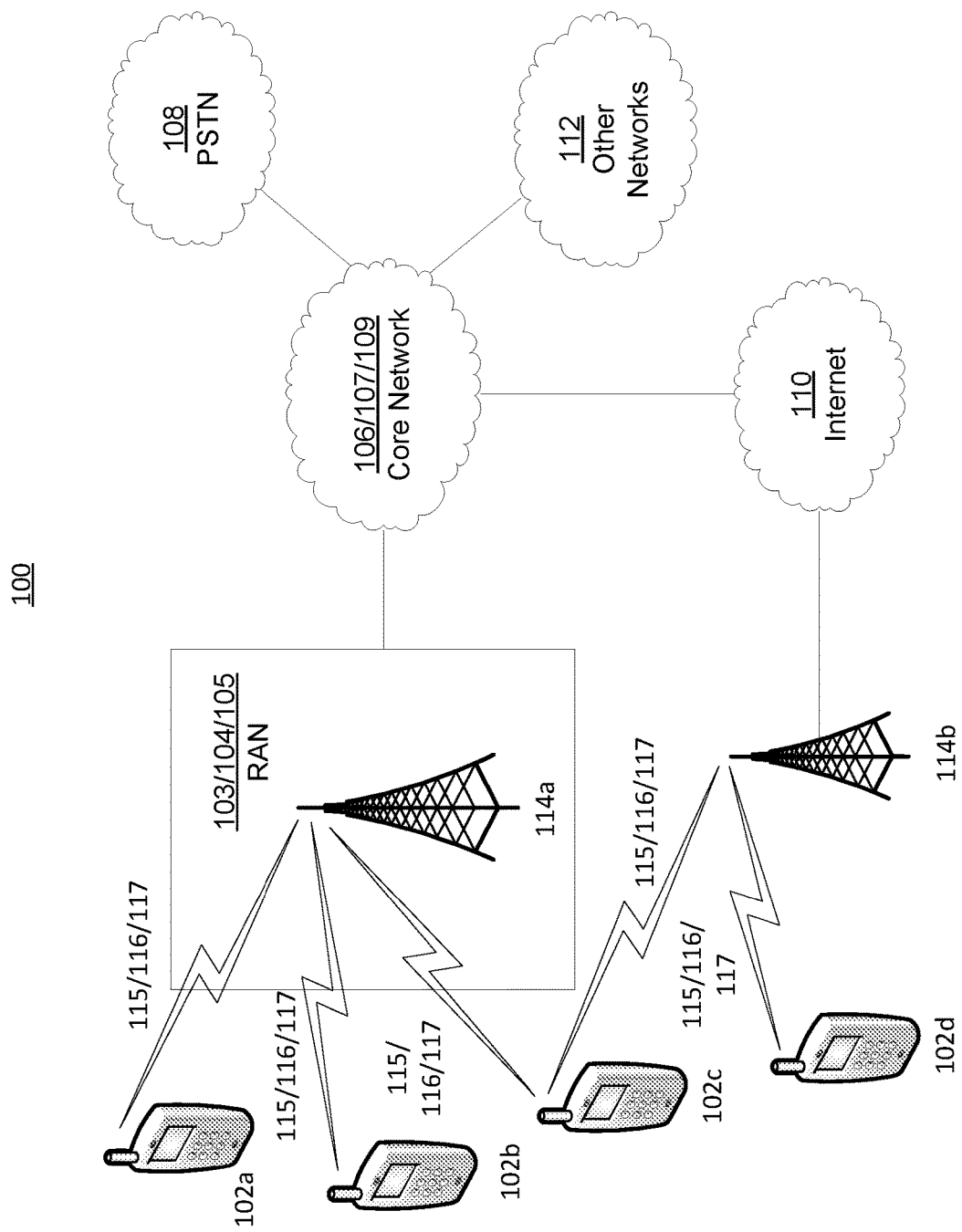
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
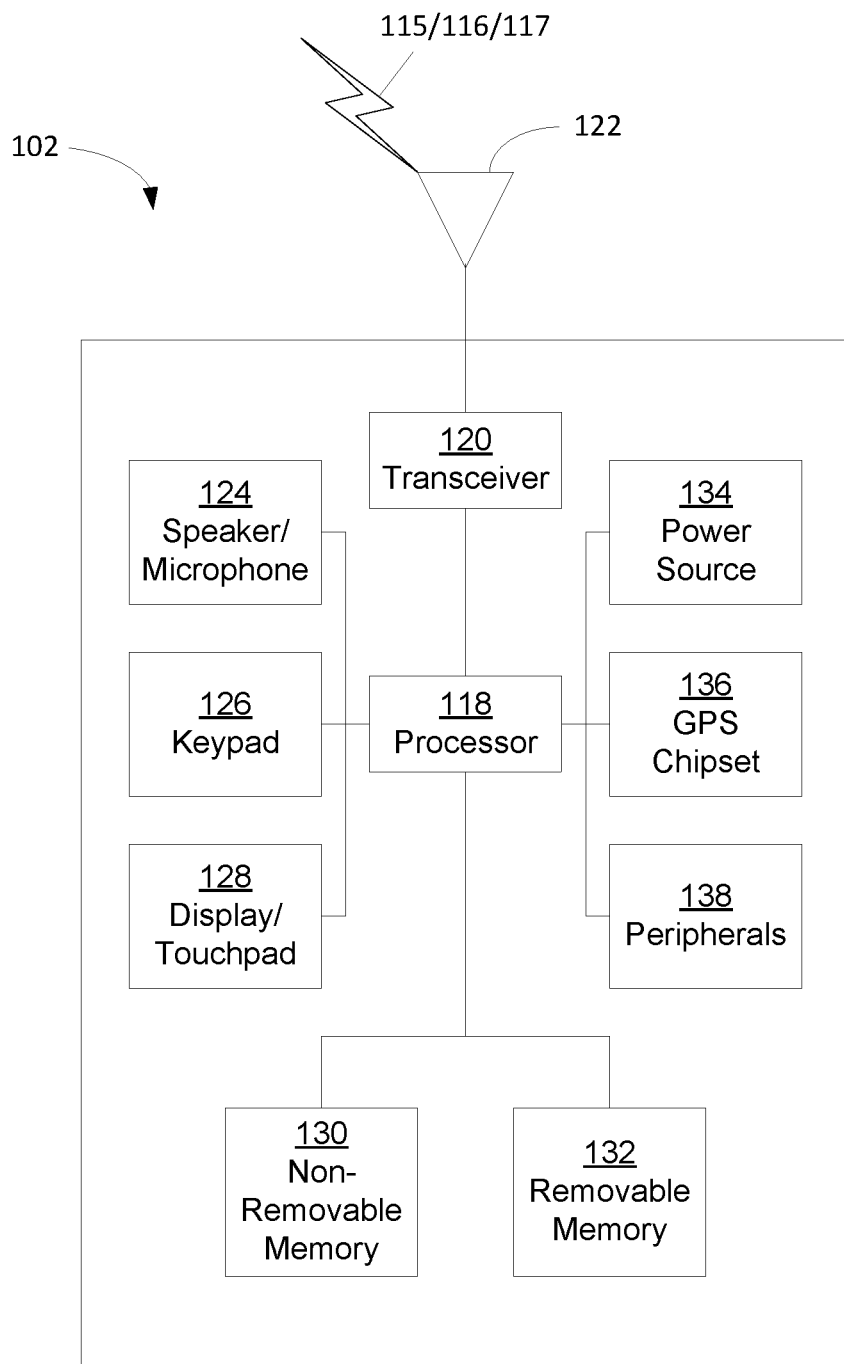
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
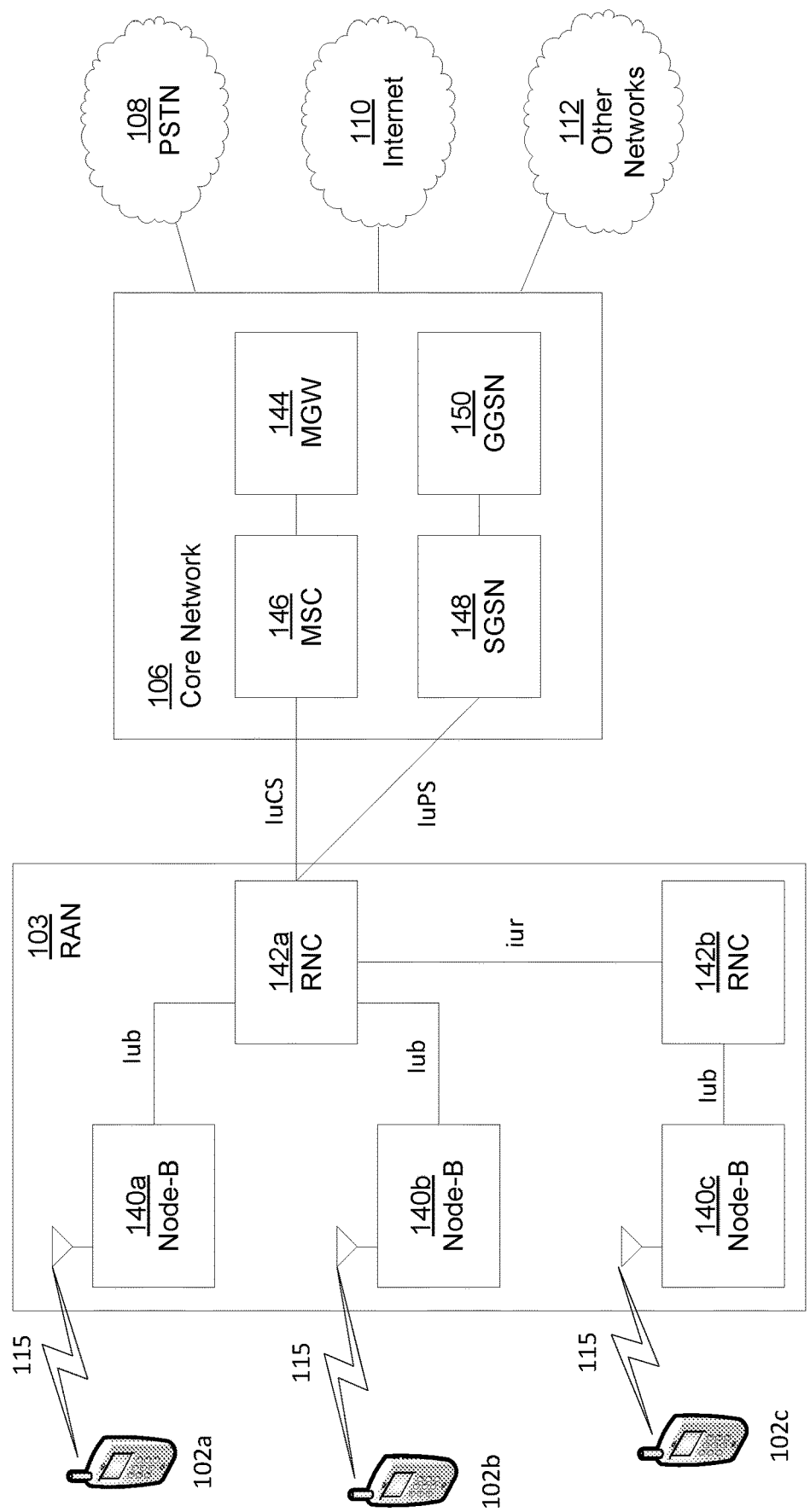
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
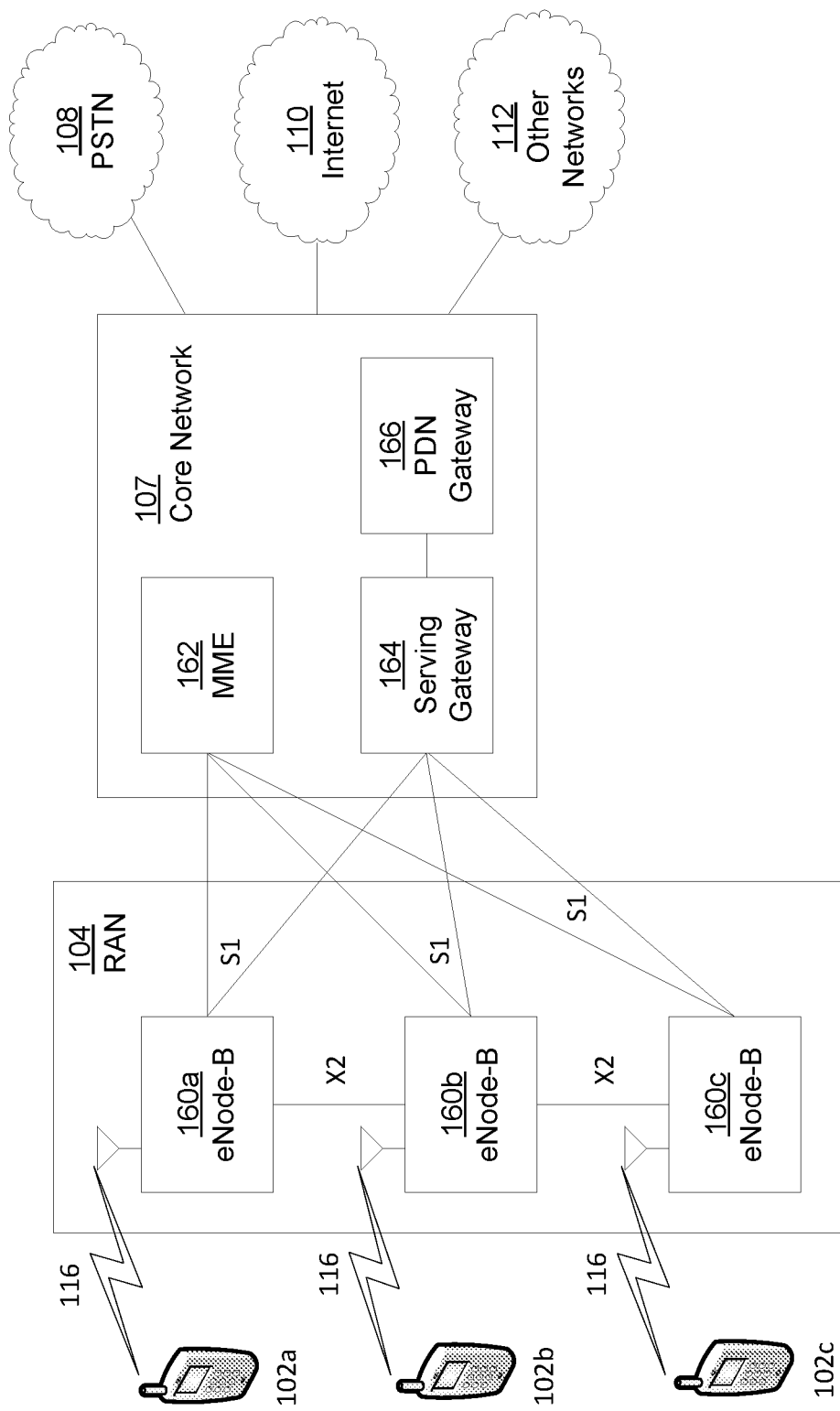
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
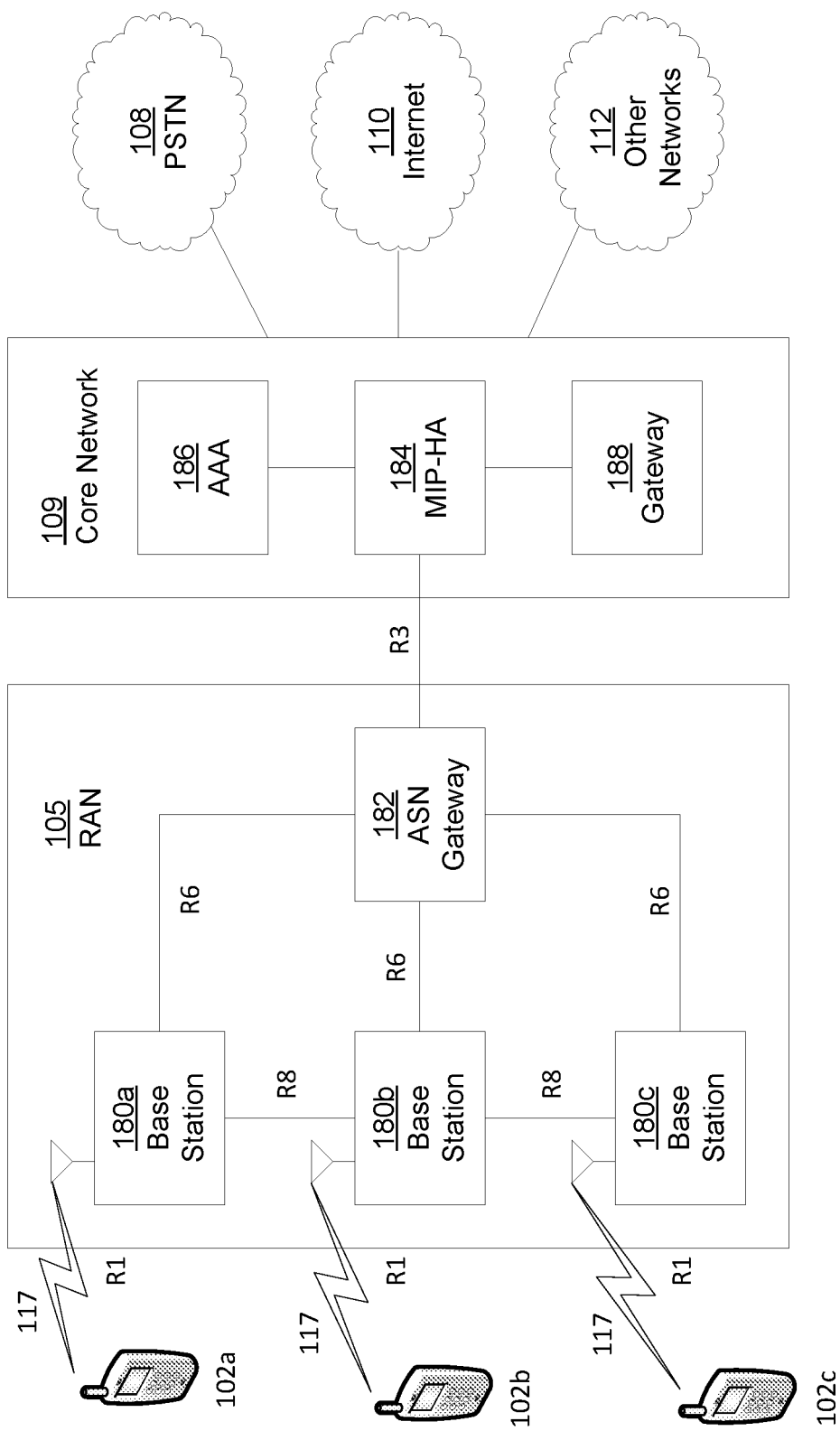
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

An LTE system may operate a carrier and/or a cell in the downlink (DL) and/or uplink (UL) with a pre-determined system bandwidth (BW) (e.g., such as 1.4 MHz, 3 MHz, 5 MHZ, 10 MHZ, or 20 MHz). Subcarrier spacing may be 15 kHz. A timeslot may comprise 0.5 ms. A subframe in time may comprise 2 timeslots and/or 1 ms. A frame may comprise one or more subframes (e.g., such as 10). The DL may be based on orthogonal frequency division multiple access (OFDMA). The UL may be based on single carrier frequency division multiple access (SC-FDMA). A subframe may comprise one or more symbols (e.g., such as 14 symbols in a subframe for a normal cyclic prefix (CP)). The first 0, 1, 2, or 3 symbols in the DL may be used and/or reserved for a physical DL control channel (PDCCH) or other purposes.

Allocation in the UL and/or DL may be in terms of resource blocks (RBs) and/or RB-pairs. An RB may comprise 1 timeslot×12 subcarriers (e.g., 1 timeslot×180 kHz). A minimum allocation may be used, for example, for at least some channels (e.g., physical downlink shared channel (PDSCH), PUSCH). The minimum allocation may be, for example, an RB-pair. An RB-pair may comprise 2 timeslots (e.g., 1 subframe). An RB may comprise a physical RB (PRB). An RB and a PRB may be used interchangeably. An RB may represent one RB, an RB-pair, and/or a PRB-pair.

A system and/or a component of a system (e.g., a WTRU/UE, a device, or an eNodeB) may use, operate with, and/or allocate resources. The system and/or component of the system may use, operate with, and/or allocate resources in a bandwidth that may be different from (e.g., smaller than) at least one other communication system bandwidth, e.g., such as an LTE bandwidth. For example, the device may be configured to utilize an LTE bandwidth such as the 1.4 MHz bandwidth, and a second bandwidth that may be, for example, smaller than the LTE system bandwidth. The different (e.g., smaller or reduced) bandwidth may be 200 kHz or 180 kHz (e.g., 200 kHz total BW with a 180 kHz usable or transmission BW). The term Narrowband LTE (NB-LTE) may be used to refer to or represent a system and/or a system component when a device is configured to operate using a portion (e.g., subset of) the LTE system bandwidth. An example, of NB-LTE operation may include a device that operates with a 200 kHz total bandwidth (e.g., with a 180 kHz useable bandwidth) while camped on and/or connected to an LTE cell that is operating using one of a 1.4 MHz, 3 MHz, 5 MHZ, 10 MHZ, or 20 MHz cell bandwidth. LTE is used as a non-limiting example of a type of communication system. Another type of communication system may be substituted for LTE and still be consistent with this disclosure.

A WTRU configured to operate in a bandwidth that may be smaller than an LTE bandwidth may be referred to as a NB-LTE WTRU. A WTRU, a bandwidth limited WTRU, a NB-LTE WTRU, a NB-IoT WTRU, an IoT WTRU, a low-cost WTRU, a low-complexity WTRU, a reduced bandwidth WTRU, and a limited capability WTRU may be used interchangeably herein. The terms coverage limited WTRU and a reduced bandwidth WTRU may be used interchangeably herein.

The terms cell and eNB may be used interchangeably herein.

Although some examples may be described with respect to the PDCCH, the examples may be equally applicable to signaling using other types of control channels such as the enhanced PDCCH (EPDCCH), the machine-type communication (MTC) PDCCH (M-PDCCH), narrowband PDCCH (NB-PDCCH), and/or another DL control channel and still be consistent with this disclosure. The terms component carrier (CC) and serving cell may be used interchangeably herein. The terms WTRU, WTRU medium access control (MAC) entity, and MAC entity may be used interchangeably herein.

Examples of Uplink Control Information (UCI) transmission may be provided. An LTE UCI may comprise UL feedback information. The UL feedback information may include Channel Quality Information (CQI), a Precoding Matrix Indicator (PMI), a Rank Indicator (RI), and/or a hybrid automatic repeat request (HARQ) information (e.g., acknowledgment (ACK) and/or negative ACK (NACK)) corresponding to a DL transmission. The CQI may indicate a modulation and coding scheme (MCS) level (e.g., a preferred MCS level). The PMI may indicate a precoding matrix (e.g., a preferred precoding matrix) for multiple input multiple output (MIMO) operation. The RI may indicate a number (e.g., a preferred number) of layers.

Two or more UCI transmission formats may be supported. The two or more UCI transmission formats may include a physical uplink control channel (PUCCH) based UCI transmission, a physical uplink shared channel (PUSCH) based UCI transmission, and/or the like.

The PUCCH based UCI transmission may comprise a dedicated channel for UCI transmission. The dedicated channel for UCI transmission may be located in a boundary of an UL system bandwidth (e.g., the PUCCH region).

Figure 2:
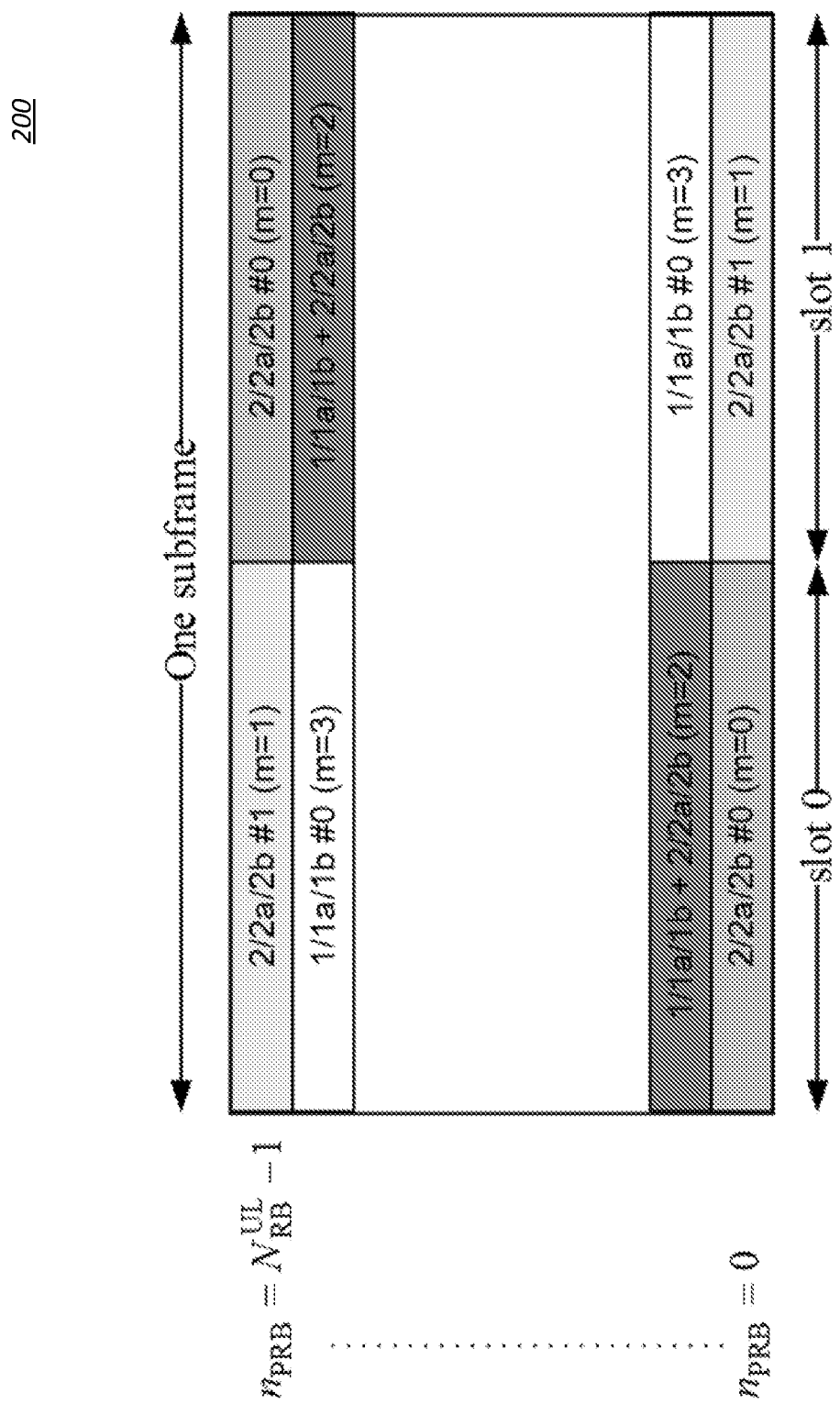
FIG. 2 is a diagram of an example mapping to physical resource blocks for a PUCCH.

FIG. 2 depicts an example mapping 200 to physical resource blocks for a PUCCH. The LTE PUCCH control structure may use frequency-domain code multiplexing. Frequency-domain code multiplexing may comprise cyclic time shifts of a base sequence. The LTE PUCCH control structure may use time-domain code multiplexing. Time-domain code multiplexing may comprise different orthogonal block spreading codes. The LTE PUCCH control structure may enable an efficient, orthogonal control channel which supports small payloads (e.g., up to 22 coded bits) from two or more WTRUs (e.g., simultaneously). The LTE PUCCH control structure may improve operational capability at low signal to noise ratio (SNR).

Figure 3:
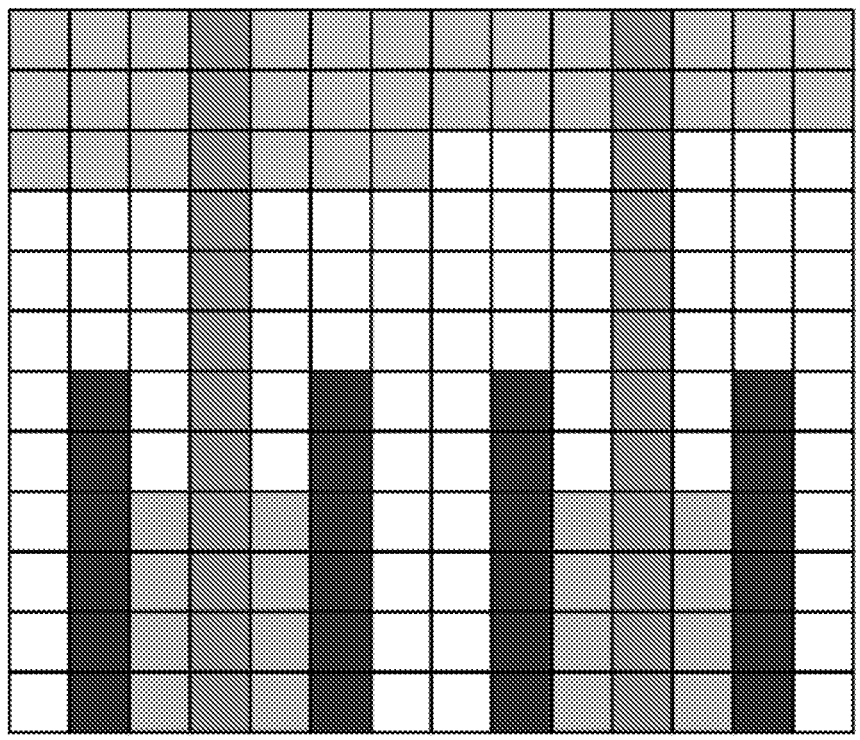
FIG. 3 is a diagram of an example UCI and UL-SCH multiplexing in a PUSCH.

FIG. 3 depicts an example UCI and UL-SCH multiplexing 300 in a PUSCH. The UCI transmission may be sent via a PUSCH (e.g., UCI on PUSCH). One or more resource elements (REs) used for CQI/PMI, ACK/NACK, and/or RI may be based on a MCS assigned for the PUSCH. One or more offset parameters may be configured (e.g., semi-statically configured) via a higher-layer signaling.

The physical resources used for a PUCCH may depend on one or more parameters (e.g., two parameters). The one or more parameters may be provided via one or more higher layers. For example, the physical resources used for PUCCH may be based on $N_{RB}^{(2)}$ and/or $N_{cs}^{(1)}$, provided by higher layers. The variable $N_{RB}^{(2)} \geq 0$ may indicate a bandwidth based on a number of resource blocks that are available (e.g., for use by PUCCH formats 2/2a/2b transmission in each slot). The variable $N_{cs}^{(1)}$ may indicate a number for the cyclic shift used for PUCCH formats 1/1a/1b in a resource block used for a mix of formats 1/1a/1b and 2/2a/2b. The value of $N_{cs}^{(1)}$ may include an integer multiple of $\Delta_{shift}^{PUCCH}$ (e.g., within the range of $\{0, 1, \ldots, 7\}$). The value of $\Delta_{shift}^{PUCCH}$ may be provided by one or more higher layers. A mixed resource block may not be present if $N_{cs}^{(1)}=0$. A resource block in each slot may support a mix of formats (e.g., 1/1a/1b and 2/2a/2b). Resources used for transmission of PUCCH formats (e.g., such as 1/1a/1b, 2/2a/2b and/or 3) may be represented by the non-negative indices $n_{PUCCH}^{(1,\tilde{p})}$, $$n_{PUCCH}^{(2,\tilde{p})} < N_{RB}^{(2)} N_{sc}^{RB} + \left\lceil \frac{N_{cs}^{(1)}}{8} \right\rceil \cdot (N_{sc}^{RB} - N_{cs}^{(1)} - 2),$$

and $n_{PUCCH}^{(3,\tilde{p})}$, respectively.

A block of complex-valued symbols $z^{(\tilde{p})}(i)$ may be multiplied with the amplitude scaling factor $\beta_{PUCCH}$ (e.g., in order to conform to a specified transmit power $P_{PUCCH}$). The block of complex-valued symbols may be mapped in sequence starting with $z^{(\tilde{p})}(0)$ to resource elements. A PUCCH may use one resource block in each of two slots in a subframe. Within a physical resource block used for transmission, the mapping of $z^{(\tilde{p})}(i)$ to resource elements (k,l) on an antenna port p (e.g., and not used for transmission of reference signals) may be in an increasing order (e.g., from k, then l and finally the slot number). The mapping of $z^{(\tilde{p})}(i)$ may begin with the first slot in a subframe. A relation between the index $\tilde{p}$ and the antenna port number p may be given by Table 1.

TABLE 1

An Example of Antenna ports used for different physical channels and signals

| Physical channel or signal | Index $\tilde{p}$ | Antenna port number p as a function of the number of antenna ports configured for the respective physical channel/signal | | |
|---|---|---|---|---|
| | | 1 | 2 | 4 |
| PUSCH | 0 | 10 | 20 | 40 |
| | 1 | — | 21 | 41 |
| | 2 | — | — | 42 |
| | 3 | — | — | 43 |
| Sounding Reference Signal (SRS) | 0 | 10 | 20 | 40 |
| | 1 | — | 21 | 41 |
| | 2 | — | — | 42 |
| | 3 | — | — | 43 |
| PUCCH | 0 | 100 | 200 | — |
| | 1 | — | 201 | — |

The physical resource blocks to be used for transmission of a PUCCH in slot $n_s$ may be determined based on the following, $$n_{PRB} = \begin{cases} \left\lfloor \frac{m}{2} \right\rfloor & \text{if } (m+n_s \bmod 2) \bmod 2 = 0 \\ N_{RB}^{UL} - 1 - \left\lfloor \frac{m}{2} \right\rfloor & \text{if } (m+n_s \bmod 2) \bmod 2 = 1 \end{cases}$$

where the variable m may depend on the PUCCH format. For example, when the PUCCH is formatted as 1, 1a, and/or 1b, the variable m may be represented as $$m = \begin{cases} N_{RB}^2 & \text{if } n_{PUCCH}^{(1,\tilde{p})} < c \cdot N_{cs}^{(1)}/\Delta_{shift}^{PUCCH} \\ \left\lfloor \frac{n_{PUCCH}^{(1,\tilde{p})} - c \cdot N_{cs}^{(1)}/\Delta_{shift}^{PUCCH}}{c \cdot N_{sc}^{RB}/\Delta_{shift}^{PUCCH}} \right\rfloor + & \text{otherwise} \\ N_{RB}^{(2)} + \left\lceil \frac{N_{cs}^{(1)}}{8} \right\rceil & \end{cases}$$

$$c = \begin{cases} 3 & \text{normal cyclic prefix} \\ 2 & \text{extended cyclic prefix} \end{cases}.$$

When the PUCCH is formatted as 2, 2a, and/or 2b, the variable m may be represented as $$m = \lfloor n_{PUCCH}^{(2,\tilde{p})}/N_{sc}^{RB} \rfloor.$$

When the PUCCH is formatted as 3, the variable m may be represented as $$m = \lfloor n_{PUCCH}^{(3,\tilde{p})}/N_{SF,0}^{PUCCH} \rfloor$$

Figure 4:
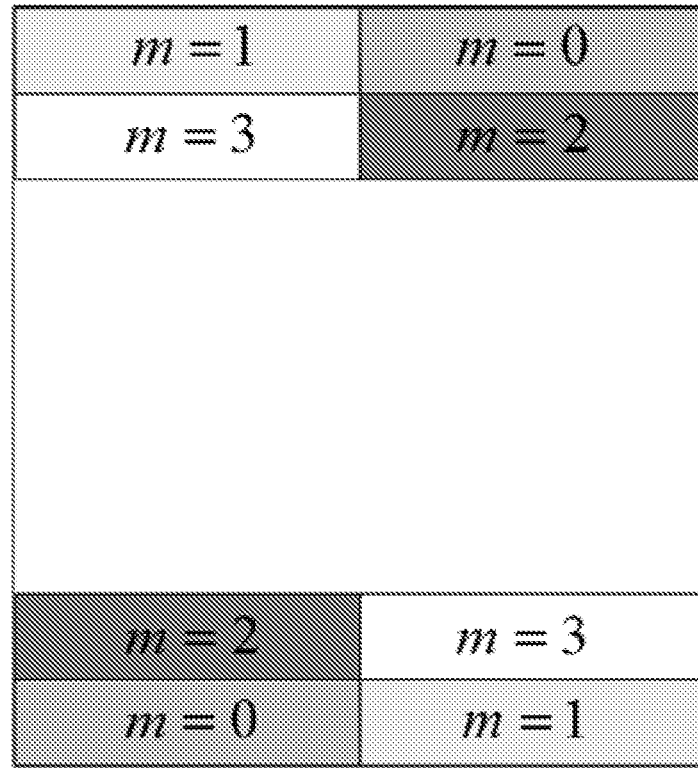
FIG. 4 is a diagram of an example mapping to physical resource blocks for a PUCCH.

FIG. 4 depicts an example mapping 400 of modulation symbols to physical resource blocks for a physical uplink control channel (PUCCH). When a sounding reference signal is transmitted with a PUCCH format 1, 1a, 1b and/or 3 and one serving cell is configured, a shortened PUCCH format may be used. For example, the last single carrier frequency division multiple access (SC-FDMA) symbol in the second slot of a subframe may be left empty/blanked, and the last SC-FDMA symbol may then be used by one or more WTRUs for transmitting a SRS in the serving cell (e.g., depending on WTRU configuration and/or network triggering). HARQ-ACK transmission on one or more (e.g., two) antenna ports ($p \in [p_0, p_1]$) may be supported for PUCCH format 1a/1b.

For FDD and one configured serving cell, the WTRU may use a PUCCH resource, $n_{PUCCH}^{(1,\tilde{p})}$, for transmission of a HARQ-ACK in a subframe, n, for $\tilde{p}$ mapped to antenna port p for PUCCH format 1a/1b. For a PDSCH transmission indicated by the detection of a corresponding PDCCH in subframe n−4, and/or for a PDCCH indicating a downlink SPS release in subframe n−4, the WTRU may use $N_{PUCCH}^{(1,\tilde{p}_0)} = n_{CCE} + N_{PUCCH}^{(1)}$ for antenna port $p_0$. Where $n_{CCE}$ may represent the number of a first CCE (e.g., a lowest CCE index used to construct the PDCCH) used for transmission of a corresponding downlink control information (DCI) assignment. $N_{PUCCH}^{(1)}$ may be configured by one or more higher layers. For two antenna port transmission, the PUCCH resource for antenna port $p_1$ may be represented by $n_{PUCCH}^{(1,\tilde{p}_1)} = n_{CCE} + 1 + N_{PUCCH}^{(1)}$.

For frequency division duplex (FDD) and one configured serving cell, the WTRU may use a PUCCH resource, $n_{PUCCH}^{(1,\tilde{p})}$ for transmission of a HARQ-ACK in subframe n for $\tilde{p}$ mapped to antenna port p for PUCCH format 1a/1b. For a PDSCH transmission on a primary cell where there is not a corresponding PDCCH detected in a subframe, n−4, the value of $n_{PUCCH}^{(1,\tilde{p})}$ may be determined according to a higher layer configuration. For a WTRU configured for one or more (e.g., two) antenna port transmission, a PUCCH resource value may map to one or more (e.g., two) PUCCH resources. A first PUCCH resource, $n_{PUCCH}^{(1,\tilde{p}_0)}$, of the one or more PUCCH resources may represent a first antenna port, $p_0$. A second PUCCH resource, $n_{PUCCH}^{(1,\tilde{p}_1)}$, of the one or more PUCCH resources may represent a second antenna port, $p_1$. A PUCCH resource value may map to a single PUCCH resource, $n_{PUCCH}^{(1,\tilde{p}_0)}$, for the first antenna port, $p_0$.

In an example, different transmission timing may be utilized for different transmissions. For example, different transmissions may be associated with different bandwidths and the different bandwidth transmissions may utilize different transmissions timing. For example, for some transmission an allocation and/or a transmission of a set of N PRBs may be spread out or expanded in the time domain over N subframes, for example, one PRB per subframe.

For example, a transmission bandwidth (BW) (e.g., a usable transmission BW) of a 1.4 MHz system may correspond to 6 PRBs and/or PRB-pairs. When operating with a reduced transmission BW (e.g., 180 kHz usable BW), 6 PRBs may be allocated for transmission and/or 6 subframes may be used for the transmission.

A value of 6 may be used for N for example purposes. Another number of PRBs and/or different expansion may be used and still be consistent with this disclosure. For example N (e.g., 6) PRBs may be expanded over X (e.g., 3) subframes with Y (e.g., 2) PRBs per subframe. Y may be equal to N/X. If N/X is not an integer, there may be up to Y PRBs per subframe where Y may equal CEIL (N/X).

In the embodiments and examples described herein, an expansion with 1 PRB per subframe may be used as a non-limiting example. Another expansion (e.g., such as 2 PRBs per subframe) may be used consistent with the embodiments and examples described herein.

Figure 5:
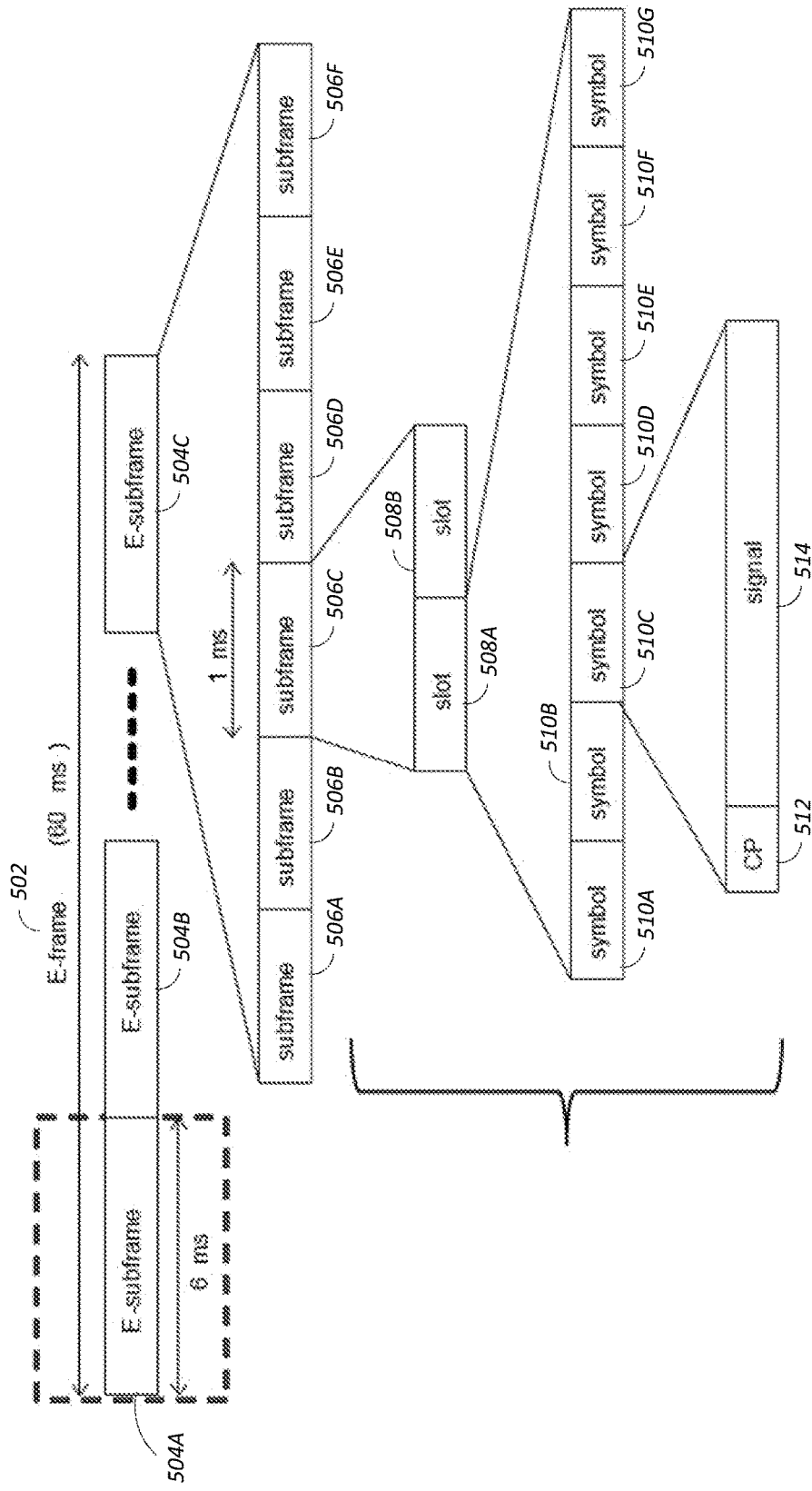
FIG. 5 is a diagram of an example expanded subframe (E-subframe).

FIG. 5 depicts an example allocation and/or transmission 500 of 6 PRBs spread out or expanded over 6 subframes (e.g., legacy subframes=6 ms). One or more (e.g., all) of the subcarrier spacing and/or the underlying OFDM symbol duration, slot duration, slot format, and subframe duration may be the same as for a legacy system. An expanded subframe (E-subframe) 504 (e.g., a new subframe) may comprise 6 ms. An expanded frame (E-frame) 502 (e.g., a new frame) may comprise 60 ms. For example, an E-frame 502 may include one or more (e.g., ten) E-subframes 504A, 504B, 504C. An E-subframe 504 may include one or more (e.g., six) subframes 506A, 506B, 506C, 506D, 506E, 506F. Each subframe 506 may be 1 ms. Each subframe 506 may include one or more (e.g., two) slots 508A, 508B. Each slot 508 may include one or more (e.g., seven) symbols 510A, 510B, 510C, 510D, 510E, 510F, 510G. Each symbol 510 may include a cyclic prefix 512 and a signal 514.

The terms subframe, a legacy subframe and/or a regular subframe may be used to refer to or represent a current, a regular, a legacy, and/or an unexpanded subframe, for example, a subframe with length of 1 ms. The terms frame, a legacy frame and/or a regular frame may be used to refer to or represent a current, a regular, a legacy, and/or an unexpanded frame, for example, a frame with length of 10 ms (e.g., 10 subframes).

An E-subframe 506 may comprise a set of one or more subframes 506A, 506B, 506C, 506D, 506E, 506F (e.g., legacy subframes). An E-frame 502 may comprise a set of one or more frames (e.g., legacy frames).

A subcarrier spacing may be reduced and/or a symbol duration may be increased proportionately. For example, a subcarrier spacing may be reduced by a factor of 6 (e.g., 15 kHz/6=2.5 kHz). The subcarrier spacing reduction may, for example, result in a 12 subcarrier allocation (e.g., such as 2.5 kHz×12=30 kHz) and/or 6 PRBs corresponding to 6×30 kHz=180 kHz. A symbol duration may be increased proportionately with a subcarrier spacing reduction. For example, a symbol duration may increase by a factor of 6. A symbol duration may be increased proportionately with a subcarrier spacing reduction for UL transmission, for example since a physical random access channel (PRACH) may already utilize a different subcarrier spacing.

Complications in WTRU and/or system operation may arise when one or more subframes are unavailable for some reason(s). The complications may be especially acute when, for example, a devices is attempting to operate according to NB-LTE in-band principles within a legacy LTE system.

For example, a narrowband system, as described herein, may use N (e.g., 6) consecutive subframes for the transmission of N PRBs. If one or more of the N consecutive subframes are not available in the same direction (e.g., due to a time division duplex (TDD) deployment for example), one or more alternative transmission schemes may be needed and/or used.

For example, one or more (e.g., a set of) subframes in one or more frames may not be available for a DL transmission. As another example, one or more (e.g., a set of) subframes in one or more frames may not be available for an UL transmission. One or more of an E-subframe, a fixed expansion, a variable expansion, a control channel expansion, and/or a data channel expansion may be provided to handle the gaps.

In an example, one or more subframes used for, designated for, and/or reserved for multimedia broadcast/multicast service (MBMS) may not be available (e.g., in the DL) for another transmission (e.g., such as an NB-LTE transmission). The one or more subframes may be referred to as multicast broadcast single frequency network (MBSFN) subframes. The MBSFN subframes may comprise DL subframes. The MBSFN subframes may be applicable to FDD systems and/or TDD systems. For example, in an LTE system, one or more MBSFN subframes (e.g., a pattern of MBSFN subframes) may be configured for one or more subframes over a period (e.g., such as 1 or 4 frames). A pattern of MBSFN subframes may repeat. For example, the pattern of MBSFN subframes may repeat every allocation period (e.g., 1, 2, 4, 8, 16, or 32 frames). The start of the pattern of MBSFN subframes may be offset from the start of a frame. The one or more configured MBSFN subframes may not be available for other DL transmissions. One or more subframes (e.g., one or more of subframes 0, 4, 5, 9) may not be configured as MBSFN subframes (e.g., for FDD). One or more subframes (e.g., one or more of subframes 0, 1, 5, and 6) may not be configured as MBSFN subframes (e.g., for TDD). The one or more configured MBSFN subframes, e.g., in a cell, may be configured and/or identified by an indication, e.g., such as higher layer or radio resource control (RRC) signaling which may be broadcast. For example, the one or more configured MBSFN subframes may be configured, signaled, and/or identified in system information. The system information may be broadcast.

In another example, one or more TDD subframes may be configured for (e.g., designated for, used for, and/or the like) a DL transmission. The one or more TDD subframes configured for a DL transmission may not be available for an UL transmission (e.g., such as an NB-LTE UL transmission). One or more TDD subframes may be configured for (e.g., designated for, used for, and/or the like) an UL transmission. The one or more TDD subframes configured for an UL transmission may not be available for a DL transmission (e.g., such as an NB-LTE DL transmission). One or more TDD subframes may be configured for (e.g., designated for, used for, and/or the like) one or more special subframes may not be available (e.g., fully available) for an UL and/or a DL transmission (e.g., such as a NB-LTE UL and/or DL transmission). A TDD UL/DL configuration for use in a cell may be configured by and/or indicated using one or more of system information, broadcast signaling, dedicated signaling, higher layer (e.g., RRC) signaling, and/or physical layer signaling. A direction (e.g., a current direction) of one or more subframes (e.g., TDD subframes) may be configured by and/or indicated using one or more of system information, broadcast signaling, dedicated signaling, higher layer (e.g., RRC) signaling, and physical layer signaling. A set of TDD UL/DL configurations may be provided or configured which may be used in or by a cell. Table 2 provides an example set of TDD UL/DL configurations. D may indicate a DL subframe. U may indicate an UL subframe. S may indicate a special subframe. A special subframe may comprise one or more of a DL portion, a guard period and/or an UL portion. A special subframe (e.g., the guard period within the special subframe) may enable transition from DL to UL.

TABLE 2

Example TDD UL/DL configurations

| Uplink-downlink configuration | Subframe number | | | | | | | | | |
| --- | --- | --- | --- | --- | --- | --- | --- | --- | --- | --- |
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

For example, to allow for flexible transmission timing, an E-subframe structure design may be utilized. An E-subframe structure design may include one or more of time expansion, subframe expansion, and/or symbol expansion. Time and/or subframe expansion may be provided and/or used.

An E-subframe may comprise N subframes. N may be an integer. N may be fixed. N may be configured semi-statically and/or dynamically. N may be a function of a number of subframes available for transmission in the transmission direction. N may be a function of a DL and/or UL per frame or other time period.

One or more subframes, e.g., S subframes, may be available for transmission, e.g., in a frame or other period. The S subframes may be fixed. The S subframes may be configured semi-statically and/or dynamically.

One or more subframes, e.g., M subframes, may be available for (e.g., used for) transmission in an E-subframe. M may be an integer. M may be less than or equal to N.

In a DL subframe, one or more symbols may be used and/or reserved for a DL control channel, e.g., a DL control region. In a DL subframe, one or more symbols may be used and/or may be available for a PDSCH transmission, e.g., a data region of the DL subframe. The DL control region may not be used for an NB transmission. For example, an NB transmission may skip the DL control region and/or may (e.g., may only) use the data region of a DL subframe. An NB transmission may include a corresponding DL control channel, e.g., a NB-PDCCH, in (e.g., only in) a data region of a DL subframe. An NB transmission may include a corresponding DL data channel, e.g., a NB-PDSCH, in (e.g., only in) a data region of a DL subframe.

An NB transmission may comprise P PRBs. The P PRBs may be transmitted as 1 PRB in each of P subframes. The P PRBs may include a NB-PDCCH, e.g., in one or more symbols of the NB transmission. The P PRBs may include an NB-PDSCH in one or more (e.g., all) of the remaining symbols. A PRB (e.g., each PRB) transmitted in a subframe may be comprised of one or more NB-PDCCH symbols and/or one or more NB-PDSCH symbols. One or more symbols intended for use by the NB-PDCCH may not be used for NB-PDSCH (e.g., in a subframe in which the NB-PDCCH is not present). M may equal P.

Figure 6:
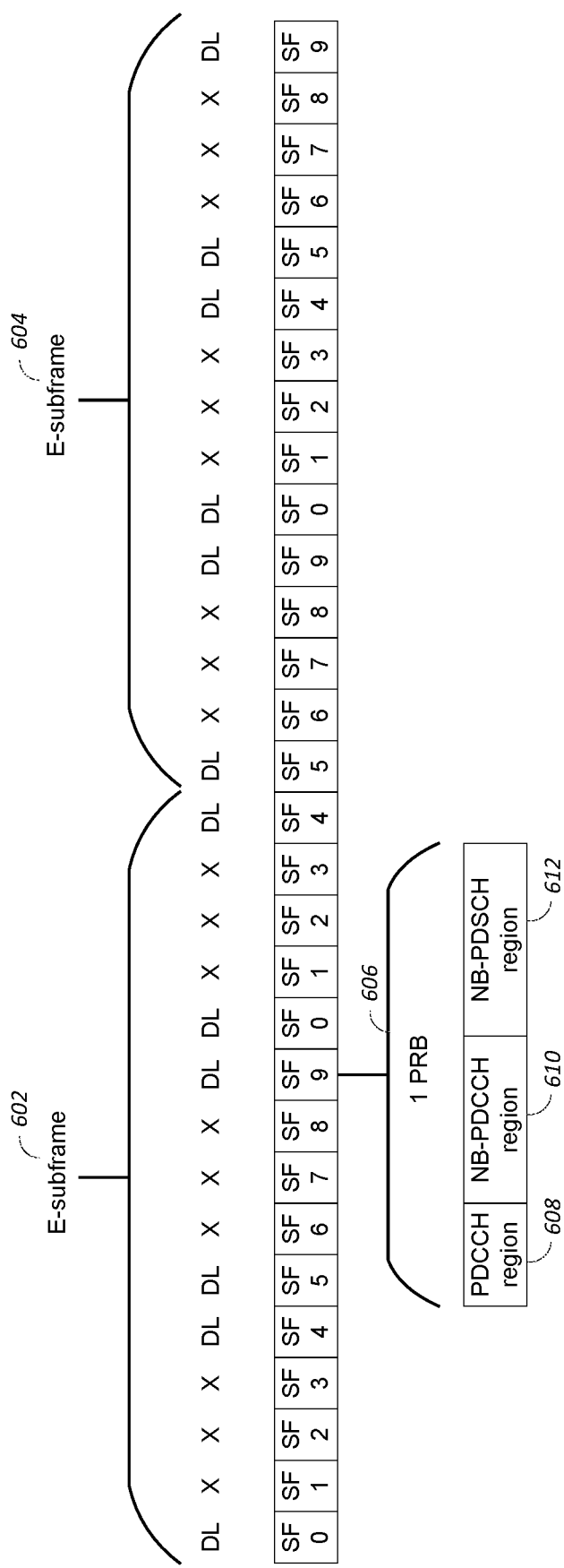
FIG. 6 is a diagram of an example E-subframe.

FIG. 6 depicts example E-subframes 602, 604. An E-subframe 602, 604 may comprise 15 subframes (e.g., N=15). The E-subframe 602, 604 may be 15 ms (e.g., if each subframe is 1 ms). A frame may include one or more (e.g., 10) subframes and/or one or more (e.g., 4) available DL subframes (e.g., S=4). An E-subframe 602, 604 may include one or more (e.g., 6) subframes available for DL transmission (e.g., M=6). For example, a 6 PRB DL transmission (e.g., P=6) may be transmitted as 6 individual PRBs in an E-subframe 602, 604. One or more available subframes (e.g., 0, 4, 5, 9) the following sets of subframes may be available for transmission over 3 consecutive frames: first 1.5 frames: 0,4,5,9,0,4; second 1.5 frames: 5,9,0,4,5,9. A subframe may include a PRB 606. The PRB 606 may include a PDCCH region 608. The PRB 606 may include a NB-PDCCH region 610. The PRB 606 may include a NB-PDSCH region 612.

An NB transmission may comprise P1 PRBs. The NB transmission may, for example, be transmitted as 1 PRB in each of P1 subframes. The P1 PRBs may include a NB-PDCCH, e.g., in one or more symbols (e.g., all of the symbols) of the NB transmission. Each of the P1 PRBs may be transmitted in a subframe. An NB transmission may comprise P2 PRBs. The NB transmission may, for example, be transmitted as 1 PRB in each of P2 subframes. The P2 PRBs may include a NB-PDSCH, e.g., in one or more symbols (e.g., all of the symbols) of the NB transmission. Each of the P2 PRBs may be transmitted in a subframe. The transmission of the P1 PRBs for NB-PDCCH may precede the transmission of the P2 PRBs for NB-PDSCH. M may equal P1+P2.

In an example, one or more (e.g., 2) PRBs may be used for transmission of a NB-PDCCH and/or one or more (e.g., 4) PRBs may be used for transmission of a NB-PDSCH (e.g., for a total of 6 PRBs).

Figure 7:
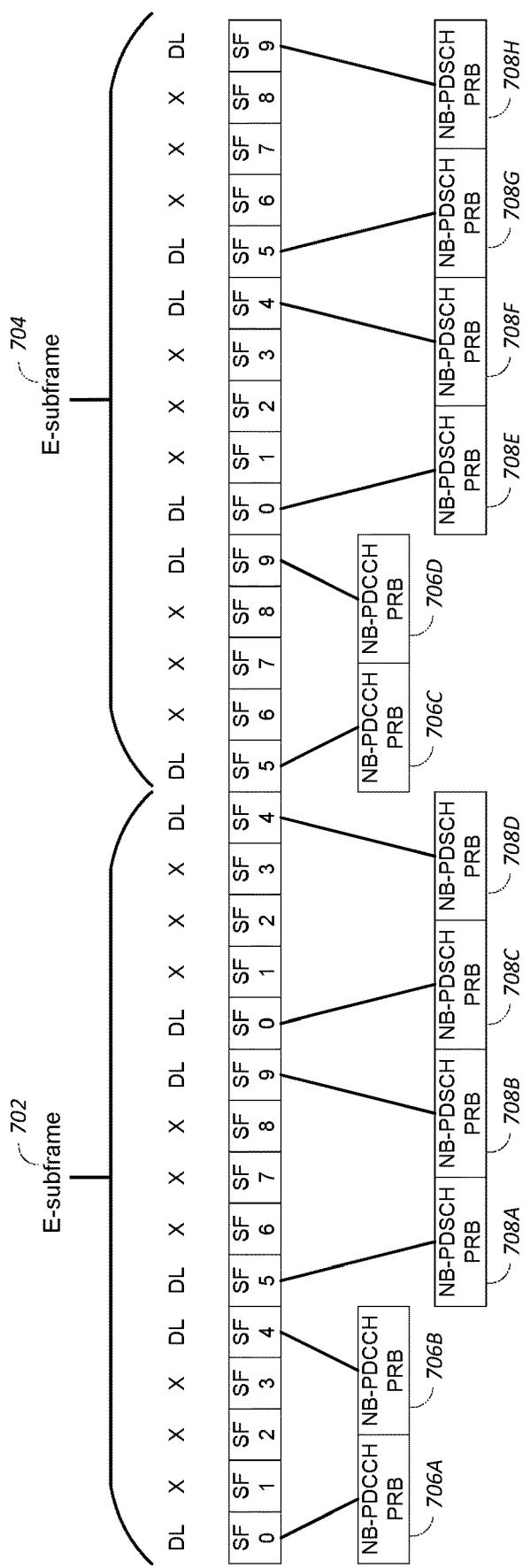
FIG. 7 is a diagram of an example E-subframe with 4 available DL subframes per frame.

FIG. 7 depicts example E-subframes 702, 704. An example E-subframe 702, 704 may comprise 15 subframes (e.g., N=15). A frame may comprise one or more (e.g., 10) subframes and/or one or more (e.g., 4) available DL subframes (e.g., S=4). An E-subframe may include one or more (e.g., 6) subframes available for DL transmission (e.g., M=6). For example, one or more (e.g., 2) PRBs 706 may be used for a NB-PDCCH and/or one or more (e.g., 4) PRBs 708 may be used for a NB-PDSCH. For example, a first PRB 706A, 706C on a first DL subframe and/or a second PRB 706B, 706D on a second DL subframe in an E-subframe 702, 704 may be used for a NB-PDCCH. One or more (e.g., four) PRBs 708A, 708B, 708C, 708D, 708E, 708F, 708G, 708E PRBs on one or more downlink subframes in an E-subframe 702, 704 may be used for a NB-PDSCH. An NB-PDCCH may be transmitted instead of an NB-PDSCH, for example if an UL grant is provided using the NB-PDCCH.

An NB-PUSCH may be granted by an NB-PDCCH. An NB UL transmission may comprise P PRBs. The NB UL transmission may, for example, be transmitted as 1 PRB in each of P subframes. One or more, e.g., all, of the symbols in an UL subframe may be used for an NB-PUSCH. In one or more subframes, the last symbol may be punctured. The last symbol may be punctured to avoid collision with one or more SRS transmissions, e.g., from one or more other WTRUs.

A timing of an E-subframe may be in accordance with regular subframes. One or more available subframes may comprise one or more starting subframes for transmitting and/or monitoring for an NB-PDCCH. The one or more starting subframes for an NB-PDCCH may be configured.

An E-subframe structure design may include expansion of one or more symbols. Subcarrier spacing may be reduced and/or symbol duration may be increased, e.g., proportionately. For example, subcarrier spacing may be reduced by a factor of 6 and/or symbol duration may be increased by a factor of 6. An E-subframe may comprise a set of expanded symbols. An expanded symbol may be referred to an E-symbol.

When increasing the symbol duration, one or more E-symbols may overlap at least part of a subframe which may not be available for transmission in the direction of the E-symbol. The overlap may be handled and/or avoided.

For example, an E-symbol which may at least partially overlap an unavailable subframe may be punctured and/or rate matched around. Puncturing and/or rate matching around an unavailable subframe may result in performance degradation. Puncturing and/or rate matching around an unavailable subframe overlap may be performed if the amount of puncturing or rate matching (e.g., absolute amount or an amount relative to the size of the transmission) is below a threshold. The threshold may be known or configured. The puncturing or rate matching may be used and/or performed by the transmitter and/or the receiver. For example, in the DL, an eNB may be the transmitter and/or a WTRU may be the receiver. As another example, in the UL, a WTRU may be the transmitter and/or an eNB may be the receiver.

An unavailable subframe overlap may be avoided by transmitting an E-symbol. The E-symbol may overlap the unavailable subframe in another available subframe, e.g., the next available subframe. For example, if a symbol duration is approximately 1 ms/14 symbols 71.4 us, then an E-symbol with an expansion of 6 may be approximately 0.43 ms. In this example, one or more (e.g., 2) E-symbols may be transmitted in a subframe. Two or more E-symbols may be transmitted in groups, e.g., groups of 2, in available subframes.

Figure 8:
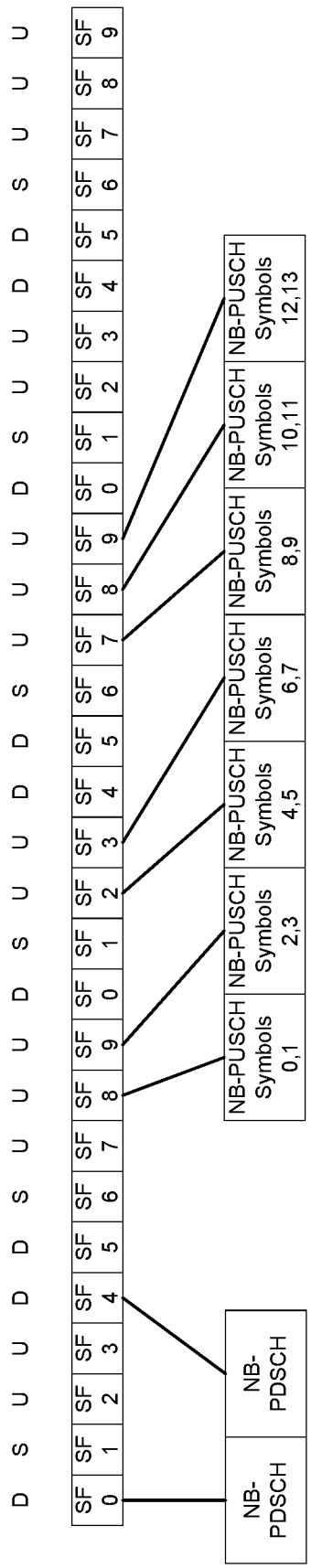
FIG. 8 is a diagram of an example symbol expansion.

FIG. 8 depicts an example symbol expansion 800. The example symbol expansion may use one or more available subframes (e.g., according to an example TDD UL/DL configuration).

A symbol may be unavailable (e.g., such as in the case of an SRS symbol). An E-symbol which may overlap with the unavailable symbol may be punctured and/or may be moved to or transmitted in another available (e.g., the next available) subframe.

An E-subframe, e.g., an UL E-subframe, may comprise at least the one or more E-symbols of an NB transmission.

A transmission opportunity and/or allocation may be substituted for a transmission as described herein.

Symbol expansion may be performed in an E-subframe.

Timing in symbol expansion may be according to regular subframes. One or more available subframes in symbol expansion may include starting subframes for transmitting and/or receiving for NB-PUSCH. A starting subframe for an NB-PUSCH may be a function of a timing of an M-PDCCH which grants the resources for the NB-PUSCH.

Expansion in time, subframe and/or symbol expansion may be fixed and/or configured.

The size of an E-subframe e.g., in terms of subframes and/or time, may be fixed and/or configured. The size of an E-subframe may be a function of one or more available subframes and/or one or more configured values. The one or more configured values may be associated with (e.g., include) the one or more available subframes. Expansion in time may be applicable to DL and/or UL.

Expansion in time, time expansion, and/or transmission time interval (TTI) (e.g., TTI size) may be substituted for each other and/or an E-subframe as described herein. A Subframe may be substituted for time and vice versa as described herein.

An E-subframe may correspond to a time needed and/or used for (e.g., for transmission of) at least P (e.g., 6) PRBs. The time needed and/or used for at least P PRBs may begin at the start of a first PRB (e.g., the start of the subframe which may contain the first PRB). The time needed and/or used for at least P PRBs may end at the end of a last PRB (e.g., the end of the subframe which may contain the last PRB). The time needed and/or used for the at least P PRBs may be a time span which includes and/or is at least as large as a time from a start of the first PRB to an end of the last PRB. An E-subframe may include a fixed starting subframe. An E-subframe may include a variable starting subframe.

Expansion may include a transmission and/or reception of a portion of one or more (e.g., P) PRBs in each of a set of subframes. The portion of the one or more PRBs may be the same or different in each of the subframes in the set of subframes. The portion of the one or more PRBs may comprise an integer number of PRBs, for example for time expansion. The portion of the one or more PRBs may comprise a number (e.g., an integer number) of symbols of one or more of the P PRBs.

One or more available subframes in a given direction may be configured (e.g., by the eNB via signaling). The one or more available subframes may be determined (e.g., known) by the WTRU. One or more available subframes in the DL may (e.g., may be used to) determine a TTI and/or an expansion in time for the DL and/or the UL.

An E-frame may comprise a set of E-subframes. An E-frame may comprise 10 E-subframes, for example to align with an existing relationship of 1 frame=10 subframes.

Each frame may correspond to a system frame number (SFN). An expansion frame number (E-SFN) may correspond to one or more (e.g., each) E-frames. EFN and E-SFN may be used interchangeably. An E-SFN cycle may comprise a number of (e.g., 1024) E-frames. An E-SFN cycle may correspond to a number of E-frames (e.g., the smallest number of E-frames). The number of E-frames may comprise an integer multiple of an SFN cycle.

A WTRU may need to know an SFN and/or an E-SFN (e.g., to understand which subframes to use for transmission and/or reception in a frame and/or E-frame). An E-SFN may coincide with an SFN. For example, E-SFN 0 and SFN 0 may coincide, e.g., periodically. An E-SFN cycle may comprise a period that SFN 0 and E-SFN 0 coincide. An E-SFN cycle may comprise a multiple of the period that SFN 0 and E-SFN 0 coincide.

An E-SFN cycle for determining the available subframes may begin with E-SFN 0. An E-SFN cycle for determining the one or more available subframes may begin when E-SFN 0 and SFN 0 coincide.

A WTRU may transmit in the UL and/or receive in the DL in one or more subframes corresponding to an E-subframe. A WTRU may transmit in the UL and/or receive in the DL in one or more available subframes in an E-subframe. A WTRU may receive a DL control channel in one or more PRBs expanded over at least part of an E-subframe. The DL control channel may provide an UL grant and/or a DL grant for a NB-PUSCH and/or NB-PDSCH. The NB-PUSCH and/or NB-PDSCH may begin k subframes after a last subframe of an E-subframe carrying the DL control channel and/or k subframes after a last subframe of the DL control channel. The WTRU may receive the NB-PDSCH and/or transmit the NB-PUSCH based on the UL grant and/or the DL grant.

A NB-PDSCH may begin at a start of a next DL E-subframe (e.g., for DL reception). A NB-PDSCH may begin at a start of a first available DL subframe (e.g., for DL reception). The first available DL subframe may be in a next DL E-subframe. A NB-PUSCH may begin at a start of a next UL E-subframe (e.g., for UL reception). A NB-PUSCH may begin at a start of a first available UL subframe. The first available UL subframe may be in a next UL E-subframe. The next UL E-subframe may be at least k subframes after a last subframe (e.g., of the E-subframe) carrying a DL control channel. The value of k may be 0 or 1 (e.g., for DL) or 4 (e.g., for UL).

An available subframe may be a subframe that is available for transmission and/or reception in that direction (e.g., for a direction of transmission and/or reception).

Repetition may be used in the UL and/or DL (e.g., in coverage enhanced (CE) mode). One or more repetitions may be performed in one or more available subframes and/or E-subframes.

An E-subframe may include frequency hopping among one or more subframes (e.g., available subframes) in the E-subframe. A WTRU may receive a DL transmission (e.g., a DL control channel and/or a NB-PDSCH) in a frequency hopped E-subframe (e.g., according to a frequency hopping pattern and/or rule). A WTRU may transmit in the UL in an E-subframe (e.g., according to a frequency hopping pattern and/or rule). A frequency hopping pattern and/or rule may be configured by higher layer signaling and/or physical layer signaling (e.g., such as in a DCI format grant and/or allocation for a NB-PDSCH and/or NB-PUSCH).

One or more of time expansion, symbol expansion, TTI size, and/or E-subframe size may be variable. Variable expansion may be in terms of one or more subframes and/or time units (e.g., ms).

An expansion type may correspond to an amount and/or level of expansion in time and/or frequency. For example, an expansion type may correspond to 1 PRB in each of 6 subframes, 1 PRB on each of 3 subframes, 2 PRBs in each of 3 subframes, and/or the like. An expansion time may correspond to one or more symbols and/or subframes. An expansion frequency may correspond to one or more subcarriers and/or groups of subcarriers (e.g., PRBs) for example in a subframe.

Variable expansion may include one or more transmission parameters. The one or more transmission parameters may include one or more of a transport block size (TBS), a modulation and coding scheme (MCS), one or more coded bits for transmission, one or more coded bits for reception, a subcarrier spacing, one or more allocated and/or granted PRBs, one or more PRBs to transmit in a subframe, one or more subframes to use for the expansion, and/or an expansion type.

A transmission parameter may be determined from one or more parameters. A transmission parameter and/or one or more parameters from which the transmission parameter may be determined may be signaled by an eNB to a WTRU. The transmission parameter and/or one or more parameters from which the transmission parameter may be determined may be signaled in a DL control channel and/or DCI format. A DCI format may correspond to an UL and/or DL allocation and/or grant. A transmission parameter and/or one or more parameters from which the transmission parameter may be determined may be semi-statically signaled (e.g., in dedicated signaling such as RRC signaling or broadcast signaling such as in system information which may be broadcast).

A transport block size (TBS) and/or one or more other transmission parameters may be determined as a function of one or more available subframes in a period of time (e.g., such as an E-subframe). For example, a smaller TBS may be used when fewer subframes are available for expansion.

The TBS and/or one or more other transmission parameters may be determined by an eNB and/or the WTRU. The eNB may signal to the WTRU an eNB determined parameter and/or one or more other parameters from which the WTRU may determine the eNB determined parameter. The eNB may signal the eNB determined parameter via an NB-PDCCH and/or a DCI format.

A time period and/or TTI (e.g., for transmission) may be determined to provide a sufficient number of available subframes, for example for a TBS and/or one or more PRBs. An increased TTI may be used below a pre-determined threshold (e.g., minimum) number of available subframes. For a nominal TTI and/or an E-subframe size of N (e.g., 6) subframes, if the number of available subframes is below a pre-determined threshold (e.g., 3 subframes), the TTI and/or size of the E-subframe may be increased. The TTI and/or the size of the E-subframe may be increased to include at least a threshold number of available subframes. A TBS and/or a PRB allocation may be selected (e.g., chosen or used) which corresponds to an increased TTI and/or the threshold number of available subframes. A TBS and/or a PRB allocation may be selected which corresponds to an expansion over the available subframes in a nominal TTI (e.g., if the available subframes in the nominal TTI is at or above a threshold). The TTI and/or E-subframe size may be determined by an eNB.

Repetition may be used in the UL and/or DL (e.g., in coverage enhanced (CE) mode). A repetition may include a repeated transmission. One or more repetitions may be performed in one or more available subframes and/or E-subframes. A repeated transmission may include an expansion included in an original transmission. The expansion included in the repeated transmission may include one or more (e.g., all) of time, frequency, and/or symbols.

Control channel and data channel expansion may be used. The expansion for the control channel may be separate from (e.g., different than) the expansion for the data channel.

A DL control channel (e.g., an NB-PDCCH) may be transmitted separately from a DL data channel (e.g., an NB-PDSCH). An NB-PDCCH and/or a DCI which may be carried by the NB-PDCCH may include and/or indicate a time and/or time expansion information for at least one of an NB-PDSCH and/or an NB-PUSCH.

DL control channel (e.g., Q-PDCCH) and DCI may be used interchangeably. Q in Q-PDCCH may be a (e.g., any) prefix (e.g., such as E, M, NB, and/or no prefix). DCI and DCI format may be used interchangeably.

A DCI may provide a grant and/or allocation for UL and/or DL resources. A WTRU may transmit, e.g., a NB-PUSCH, in the granted or allocated UL resources. A WTRU may receive, e.g., a NB-PDSCH, in the granted or allocated DL resources.

An eNB may transmit and/or a WTRU may monitor for an NB-PDCCH in an expanded manner. An NB-PDCCH may be expanded over X subframes where X may represent one or more PRBs configured and/or used for an NB-PDCCH. For example, X may be 2 or 4.

An NB-PDCCH may be transmitted in one or more subframes available (e.g., always available or always at least partially available) for DL transmission. For example, in FDD, a set of subframes (e.g., such as {0, 4, 5, 9}) may (e.g., may always) be available for DL transmission. An NB-PDCCH may (e.g., may only) be transmitted in the set of subframes. The one or more subframes available for a DL and/or for an NB-PDCCH transmission may be known or may be configured and/or identified. For example, the one or more subframes available for a DL and/or for an NB-PDCCH transmission may be determined using a received indication via signaling (e.g., such as broadcast signaling such as in system information and/or a PBCH). A WTRU may receive the indication. The WTRU may determine in which subframes to monitor for an NB-PDCCH.

The one or more subframes which may be used for an NB-PDCCH transmission may be known or may be configured and/or identified. For example, the one or more subframes which may be used for an NB-PDCCH transmission may be determined using a received indication via signaling (e.g., such as broadcast signaling such as in system information and/or a PBCH). A WTRU may receive the indication. The WTRU may determine in which subframes to monitor for an NB-PDCCH.

One or more subframes may be used for a starting subframe for an NB-PDCCH transmission and/or expansion. The one or more subframes may be configured and/or determined. For example, the one or more subframes may be determined based on one or more available DL subframes (e.g., for an NB-PDCCH) and/or one or more PRBs configured and/or used for an NB-PDCCH. For example, if the available subframes for a DL transmission or for an NB- PDCCH are a set of subframes in each frame, e.g., {0, 4, 5, 9}, and one or more PRBs configured and/or used for the NB-PDCCH is X, e.g., 2, the NB-PDCCH may begin in one of the subframes in the set (e.g., any one of the subframes). The NB-PDCCH may be limited to begin in one or more certain subframes in the set (e.g., such as {0,5}). When the NB-PDCCH is limited to begin in one or more certain subframes in the set, a 2 PRB NB-PDCCH may be transmitted as 1 PRB in each of subframes 0 and 4. The 2 PRB NB-PDCCH may be transmitted as 1 PRB in each of subframes 5 and 9. When the NB-PDCCH is not limited to begin in one or more certain subframes in the set, a 2 PRB NB-PDCCH may be transmitted as 1 PRB in each of subframes {0, 4}, {4, 5}, {5, 9}, and/or {9, 0}.

A WTRU may monitor one or more sets (e.g., each possible set) of X subframes (e.g., to receive an NB-PDCCH). A CE mode WTRU may combine one or more repetitions of a set (e.g., to successfully receive the NB-PDCCH).

One or more available subframes may be configured over a time period (e.g., such as 1 or 4 subframes).

An NB-PDCCH and/or a DCI may include a frequency allocation and/or grant for a NB (e.g., NB-PDSCH and/or NB-PUSCH) transmission and/or reception. The NB-PDCCH and/or DCI may include a time and/or symbol allocation and/or grant for a NB (e.g., NB-PDSCH and/or NB-PUSCH) transmission and/or reception.

An NB-PDCCH and/or a DCI may include (e.g., identify) at least one of a time location, a time expansion, and/or a symbol expansion for a NB transmission and/or reception. Identification of the time location, the time expansion, and/or the symbol expansion may be explicit. The time location, the time expansion, and/or the symbol expansion may be determined (e.g., using one or more parameters and/or values included in the NB-PDCCH and/or DCI).

For example, an NB-PDCCH and/or a DCI may indicate one or more subsequent subframes (e.g., which subframes following the subframes that contain the NB-PDCCH) that may include at least part of the allocated and/or granted NB-PDSCH and/or NB-PUSCH. A time allocation may be relative to the NB-PDCCH and/or to a current and/or next E-subframe and/or E-frame.

An NB-PDCCH and/or a DCI may include at least one of the following. The NB-PDCCH and/or DCI may include a starting subframe for the NB transmission (e.g., for example as a delta in subframes and/or available subframes from the last subframe of the NB-PDCCH expansion). The NB-PDCCH and/or DCI may include a number of subframes (e.g., available subframes) to use for expansion. The NB-PDCCH may include number of PRBs and/or subcarriers to transmit in a subframe. The NB-PDCCH and/or DCI may include an indication of whether to use symbol expansion and/or subframe expansion. The NB-PDCCH and/or DCI may include one or more specific subframes to use for expansion (e.g., relative to the starting subframe for the expansion). A bitmap may be used to identify the one or more specific subframes. The NB-PDCCH and/or DCI may include one or more available subframes (e.g., in the UL and/or DL direction) for a current and/or future time period (e.g., such as the current and/or next frame and/or E-frame. The NB-PDCCH and/or DCI may include a transport block size (TBS) and/or one or more parameters from which to determine the TBS. The NB-PDCCH and/or DCI may include a modulation and coding scheme (MCS). The NB-PDCCH and/or DCI may include a subcarrier spacing. The NB-PDCCH and/or DCI may include a number of allocated and/or granted PRBs. The NB-PDCCH and/or DCI may include a number of PRBs to transmit in a subframe. The NB-PDCCH and/or DCI may include a location of the PRB and/or starting PRB in each subframe of the expansion (e.g., a single location to use in each subframe or a location to use with a frequency hopping pattern in each subframe).

A starting subframe for a NB transmission may be included in the NB-PDCCH and/or DCI. The starting subframe for the NB transmission may be determined relative to the NB-PDCCH. For example, the starting subframe for the NB transmission may be the next available subframe, in the direction of the transmission, that is at least k subframes from the last subframe of the NB-PDCCH expansion and/or the last repetition of the NB-PDCCH expansion (e.g., when operating with coverage enhancements). The value of k may be 0 or 1 for NB-PDSCH. The value of k may be 4 for NB-PUSCH. For TDD, the value of k may be a function of the TDD UL/DL configuration.

The number of subframes to use for expansion may be equal to a number of allocated and/or granted PRBs. The WTRU may determine the number of allocated PRBs from the contents of the DCI format. The WTRU may use the number of allocated PRBs as the number of subframes to use for expansion (e.g., for DL reception and/or UL transmission).

An expansion of P subframes may correspond to one PRB per subframe (e.g., for each of P subframes). The first of the P subframes may be the determined starting subframe. The remaining P−1 subframes may be the next P−1 available subframes and/or designated subframes (e.g., according to the DCI).

A WTRU may determine one or more parameters for expansion based on one or more rules and/or received parameters. The WTRU may transmit and/or receive in accordance with the determination.

Attempt to receive may be substituted for receive as described herein.

Reception may be substituted for transmission as described herein.

An NB-PDCCH may include a physical HARQ indicator channel (PHICH) channel (e.g., such as an NB-PHICH).

A TDD special subframe may be treated differently for control channels (e.g., NB-PDCCH) and data channels (e.g., NB-PDSCH and/or NB-PUSCH). One or more special subframes may be used for one or more of NB-PDCCH, NB-PDSCH, and/or NB-PUSCH (e.g., based on meeting threshold criteria). The threshold criteria may be different for one or more different channels. A special subframes may not be (e.g., may never be) used for one or more of NB-PDCCH, NB-PDSCH, and/or NB-PUSCH. For example, one or more special subframes may be used for NB-PDCCH if the DL part meets a threshold criteria such as the time of the DL part exceeds a threshold. The same or a different threshold may be used to determine whether a special subframe may be used for NB-PDSCH and/or special subframes may not be used for NB-PDSCH. A special subframe may not be used for NB-PUSCH.

Frequency hopping may be used among one or more subframes (e.g., which may be used in an NB expansion). For example, two or more frequencies may be hopped from a first subframe of an expansion to a second subframe of the expansion. Frequency hopping may include a configured and/or known pattern and/or rule. For an NB-PDSCH and/or an NB-PUSCH, the frequency hopping pattern and/or rule may be configured by higher layer signaling and/or physical layer signaling (e.g., such as in a DCI format grant and/or allocation for a NB-PDSCH and/or NB-PUSCH). A WTRU may receive a DL transmission (e.g., a DL control channel and/or an NB-PDSCH) in a frequency hopped manner (e.g., according to the frequency hopping pattern and/or rule). A WTRU may transmit, in the UL, using the frequency hopping pattern and/or rule.

An NB-PDCCH and an NB-PDSCH may be transmitted in a subframe. The NB-PDCCH and the NB-PDSCH may be expanded over P subframes (e.g., P available subframes). The WTRU may receive P subframes of data. The WTRU may determine how to decode a NB-PDSCH portion of the data (e.g., using a NB-PDCCH portion of the data). The WTRU may use a frequency location for DL data reception. The frequency location for DL data reception may be a function of a WTRU ID and/or a broadcast configuration. P may be a fixed value.

Expansion in time may be performed in a similar manner to the way in which repetitions are performed for channel estimation (CE). For CE, the repetitions may be of an entire channel and/or a transport block (TB). For CE, the repetitions may be performed in subframes which may be configured and/or identified as available. A receiver may soft combine the repetitions (e.g., to improve performance and/or successfully receive the channel and/or TB).

For time expansion, a channel and/or TB may be divided among a set of subframes (e.g., available subframes). For time expansion, a receiver may reconstruct the channel and/or TB from one or more parts. The one or more parts may represent separate coded bits. The one or more parts may not be soft-combined. The channel and/or TB division may be in frequency (e.g., PRBs) and/or time (e.g., symbols). A time expanded channel and/or TB may be repeated (e.g., for coverage enhancement). The repetitions may be soft combined.

Expansion may be used for paging. For example, a paging frame (PF) and/or a paging occasion (PO) may be determined (e.g., for or by a WTRU). The PF and/or PO may be determined based on a rule (e.g., such as a legacy rule). The PO may be determined based on one or more of a DRX cycle and/or a WTRU-ID (e.g., such as a WTRU international mobile subscriber identity (IMSI)). A determined PO subframe (e.g., for paging a NB-LTE WTRU) may be the starting subframe for an expansion of an NB-PDCCH (e.g., which may carry a paging DCI format for the WTRU). The expansion of the NB-PDCCH may begin in the starting subframe and/or expand over P1 subframes (e.g., the next P1-1 additional subframes) which may be available for DL and/or for NB-PDCCH. A PO subframe may correspond to a subframe which may (e.g., may always) be a DL subframe. A WTRU may monitor for an NB-PDCCH for paging beginning in the determined PO and/or expanded over P1 subframes, for example with Y1 PRBs per subframe. Y1 may be 1. P1 may be a fixed and/or configured number. An NB-PDCCH for paging may include a DCI which may have a CRC scrambled with a paging RNTI (e.g., P-RNTI). The WTRU may reconstruct the NB-PDCCH from one or more transmissions in the P1 subframes. The expanded NB-PDCCH may be repeated over one or more (e.g., subsequent) available subframes (e.g., if CE is used). The WTRU may combine one or more repetitions of the NB-PDCCH (e.g., of the expanded and/or reconstructed NB-PDCCH). The WTRU may receive (e.g., successfully receive) the NB-PDCCH using the one or more repetitions of the NB-PDCCH. The one or more repetitions may be combined before and/or after reconstruction.

The NB-PDCCH and/or the DCI carried by the NB-PDCCH may provide resource allocation in frequency and/or time for a NB-PDSCH (e.g., which may carry one or more paging records). Time information may include information from which the WTRU may determine an expansion of the NB-PDSCH. The NB-PDSCH may be expanded in the same set of subframes as the NB-PDCCH or another, e.g., later, set of subframes. The WTRU may receive and/or store the NB-PDSCH while receiving the NB-PDCCH (e.g., if the NB-PDSCH is expanded in the same set of subframes as the NB-PDCCH). A later set of subframes may be a set of available subframes for DL and/or NB-PDSCH (e.g., if the NB-PDSCH is expanded in a later set of subframes). The NB-PDSCH may be expanded over P2 subframes with Y2 PRBs per subframe. Y2 may be 1. P1 and P2 may be the same or different. P2 may be included in the NB-PDCCH DCI. P2 may represent a number of allocated PRBs for NB-PDSCH.

A time relationship between the NB-PDCCH (e.g., the start or end of the NB-PDCCH expansion) and the NB-PDSCH (e.g., the start of the NB-PDSCH expansion) may be known, configured, and/or included in the DCI (e.g., the paging DCI).

If the WTRU successfully receives a paging DCI (e.g., a paging DCI with a cyclic redundancy check (CRC) scrambled with a P-RNTI), the WTRU may receive and/or decode an associated expanded NB-PDSCH (e.g., if the DCI indicates that a NB-PDSCH may be present). The WTRU may reconstruct the NB-PDSCH. The WTRU may reconstruct the NB-PDSCH from one or more transmissions in the P1 subframes (e.g., for NB-PDCCH and NB-PDSCH in the same subframes) and/or the P2 subframes (e.g., for NB-PDSCH in different or later subframes from the NB-PDCCH). The expanded NB-PDSCH may be repeated over one or more subsequent available subframes (e.g., if CE is used).

The WTRU may combine two or more repetitions of the NB-PDSCH (e.g., of the expanded and/or reconstructed NB-PDSCH) to successfully receive the NB-PDSCH. The two or more repetitions may be combined before and/or after reconstruction. The WTRU may receive the contents of the NB-PDSCH. The WTRU may determine, based on the contents of the NB-PDSCH, if there is a page for the WTRU, e.g., to determine if its IMSI or temporary mobile subscriber identity (TMSI) or shortened TMSI (s-TMSI) may be included in one of the paging records. The WTRU may determine that there is a page for the WTRU based on the contents of the NB-PDSCH, e.g., based on the presence of an IMSI and/or s-TMSI included in one of the paging records.

The paging NB-PDCCH and/or NB-PDSCH may indicate a system information update. If the WTRU receives a system information update indication from a paging NB-PDCCH and/or NB-PDSCH, the WTRU may reacquire system information (e.g., one or more SIBs).

One or more subframes available for UL and/or DL transmission may be provided and/or configured, for example via signaling and/or system information that may be broadcast. Higher layer signaling (e.g., RRC signaling and/or system information blocks (SIBs)) and/or physical layer signaling (e.g., MIB and/or PBCH) may include an indication of one or more subframes available for UL and/or DL transmission. The configuration and/or signaling may be provided by an eNB. The configuration and/or signaling may be received by one or more WTRUs. The one or more available subframes may be identified for a time period, for example, such as one or more frames (e.g., one or four frames). One or more available subframes in a direction may be identified for one or more specific purposes (e.g., all purposes). For example, one or more subframes identified as available for DL may be available for an NB-PDCCH and/or an NB-PDSCH. In another example, one or more subframes may be identified as available separately for NB-PDCCH and NB-PDSCH.

One or more available subframes may be identified explicitly. One or more available subframes may be determined from other information. For example, one or more available DL subframes may be determined from at least an MBSFN configuration and/or one or more TDD UL/DL configurations. One or more available UL subframes may be determined from at least one or more TDD UL/DL configurations. Whether TDD special subframes may be considered available for one or more UL and/or DL channels may be configured and/or determined for a configured special subframe format for a cell.

One or more available subframes may be modified via a system information update.

A primary and/or a secondary sync channel for narrowband operation may be transmitted within a NB-IoT bandwidth (e.g., 200 kHz). A narrowband primary sync signal (NB-PSS) and/or a narrowband secondary sync signal (NB-SSS) may comprise and/or expand to a consecutive 6 OFDM symbols, respectively.

For example, a NB primary synchronization signal (NB-PSS) and a NB secondary synchronization signal (NB-SSS) may be located in an MBSFN subframe candidate (e.g., 1/2/3/6/7/8 subframes in a radio frame for FDD and/or 3/4/7/8/9 subframes in a radio frame for TDD). For example, the first symbol may be used and/or reserved for a legacy WTRU and the remaining 12 OFDM symbols may be used for NB-PSS and/or NB-SSS transmission (e.g., in a subframe carrying NB-PSS and/or NB-SSS). The first 6 OFDM symbols out of the remaining 12 OFDM symbols may be used for NB-SSS and/or NB-PSS and the last 6 OFDM symbols out of the remaining 12 OFDM symbols may be used for NB-PSS and/or NB-SSS. The NB-PSS and/or NB-SSS may be referred to as NB-sync.

In a subframe carrying NB-sync, a WTRU may determine that no CRS may be transmitted in the OFDM symbols (e.g., except for the first two OFDM symbols).

In another example, a PSS and/or a SSS may be located in a non-MSBFN subframe candidate (e.g., 0/4/5/9 subframes in a radio frame for FDD, 0/1/2/5/6 subframes in a radio frame for TDD). For example, the first symbol may be used and/or reserved for a legacy WTRU and the remaining 12 OFDM symbols may be used for NB-PSS and/or NB-SSS transmission (e.g., in a subframe carrying NB-PSS and/or NB-SSS). The first 6 OFDM symbols out of the remaining 12 OFDM symbols may be used for NB-SSS and/or NB-PSS and the last 6 OFDM symbols out of the remaining 12 OFDM symbols may be used for NB-PSS and/or NB-SSS.

In a subframe carrying an NB-sync, a WTRU may determine that no cell-specific reference signal (CRS) may be transmitted in the OFDM symbols (e.g., except for the first two OFDM symbols).

An NB-sync may be transmitted in every $N_{SYNC}$ ms and/or every $N_{SYNC}$ radio frames. If a NB-IoT WTRU receives a NB-sync, the NB-IoT WTRU may acquire at least one of following: physical cell-ID, a time and frequency sync, a subframe boundary, a frame boundary, and/or a CP length.

For example, if $N_{SYNC}=4$, the NB-sync may be transmitted every 40 ms.

$N_{SYNC}$ may be a predefined number.

$N_{SYNC}$ may be determined based on a mode of operation. For example, one or more (e.g., three) modes of operations may be used for an NB-IoT WTRU.

A first mode of operation may include a stand-alone mode of operation. A second mode of operation may include a guard-band mode of operation. A third mode of operation may include an in-band mode of operation.

$N_{SYNC}$ for the third mode of operation may be longer than the first and/or second mode of operations, or vice-versa.

$N_{SYNC}$ may be determined based on one or more cell-specific parameters (e.g., such as physical cell-ID, system bandwidth, and/or the like).

NB-PSS and/or NB-SSS may be transmitted with repetition within a radio frame. For example, if no repetition is used, NB-PSS and/or NB-SSS may be transmitted over a subframe within a radio frame. If repetition is used, NB-PSS and/or NB-SSS may be transmitted over two or more subframes within a radio frame.

The number of repetitions may be determined based on a mode of operation. For example, repetition may not be used for a first and/or a second mode of operation and repetition may be used for a third mode of operation, or vice versa. In another example, repetition may be used for a second and a third mode of operation (e.g., to mitigate interference) and repetition may not be used for a stand-alone mode of operation.

The number of repetition may be determined based on one or more cell-specific parameters (e.g., such as physical cell-ID, system bandwidth, and/or the like).

NB-PSS and/or NB-SSS may be transmitted with a different duty cycle. For example, NB-PSS may be transmitted with $N_{SYNC,PSS}$ and/or NB-SSS may be transmitted with $N_{SYNC,SSS}$. $N_{SYNC,PSS}$ and/or $N_{SYNC,SSS}$ may be an integer number (e.g., 10, 20, or 30). NB-PSS may be transmitted with a shorter duty cycle (e.g., $N_{SYNC,PSS}<N_{SYNC,SSS}$). The mode of operation for the narrowband cell may be determined based on one or more of $N_{SYNC,PSS}$ and $N_{SYNC,SSS}$.

NB-PSS may be transmitted in a set of (E)-subframes and/or (E)-frames with a duty cycle (e.g., $N_{SYNC,PSS}$ [ms]). NB-SSS may be transmitted in a subset of the set of (E)-subframes and/or (E)-frames used for NB-PSS. The subset may be determined based on a mode of operation. For example, a WTRU may detect (e.g., blindly detect) the subset used for NB-SSS to determine the mode of operation. A first subset may be used to indicate a stand-alone mode of operation and/or a guard-band mode of operation. A second subset may be used to indicate an in-band mode of operation.

A physical broadcasting channel for narrowband operation may be transmitted. The physical broadcasting channel for narrowband operation may be referred to as a narrowband physical broadcast channel (NB-PBCH). One or more of following may apply.

A master information block (MIB) for narrowband operation may be used for the NB-PBCH. The MIB may include information (e.g., essential information) for narrowband Internet of Things (NB-IoT) WTRU for initial access. The MIB may be referred to as a narrowband MIB (NB-MIB).

The NB-MIB may be channel coded. One or more coded bits may be scrambled using a scramble sequence. The scramble sequence may be determined based on at least one of a cell-specific parameter (e.g., such as a physical cell-ID), a mode of operation (e.g., a WTRU may be indicated a mode of operation implicitly from the scramble sequence), and/or the like. The scramble sequence may be determined based on a duplex mode. For example, TDD and/or FDD may be indicated based on the scrambling sequence used. A first scrambling sequence may be used for FDD. A second scrambling sequence may be used for TDD. The contents of NB-MIB may be determined based on the scrambling sequence used. For example, a first set of system parameters may be transmitted via the NB-MIB if a first scrambling sequence is used. A second set of system parameters may be transmitted via the NB-MIB if a second scrambling sequence is used. The first set of system parameters and the second set of system parameters may partially overlap.

One or more coded bits of a NB-MIB may be split into Nsub sub-blocks and/or modulated. Nsub may be 4, for example. As another example, Nsub may be 8. Each of the Nsub sub-blocks may be transmitted in one or more subframes in a radio frame. For example, one or more non-MBSFN subframes may be used within a radio frame. Each of the Nsub sub-blocks may be transmitted in a different radio frame. A NB-PBCH cycle may include Nsub subblocks. For example, a WTRU may receive the NB-PBCH in each NB-PBCH cycle. The Nsub sub-blocks may be evenly distributed over time within a NB-PBCH cycle.

Figure 9:
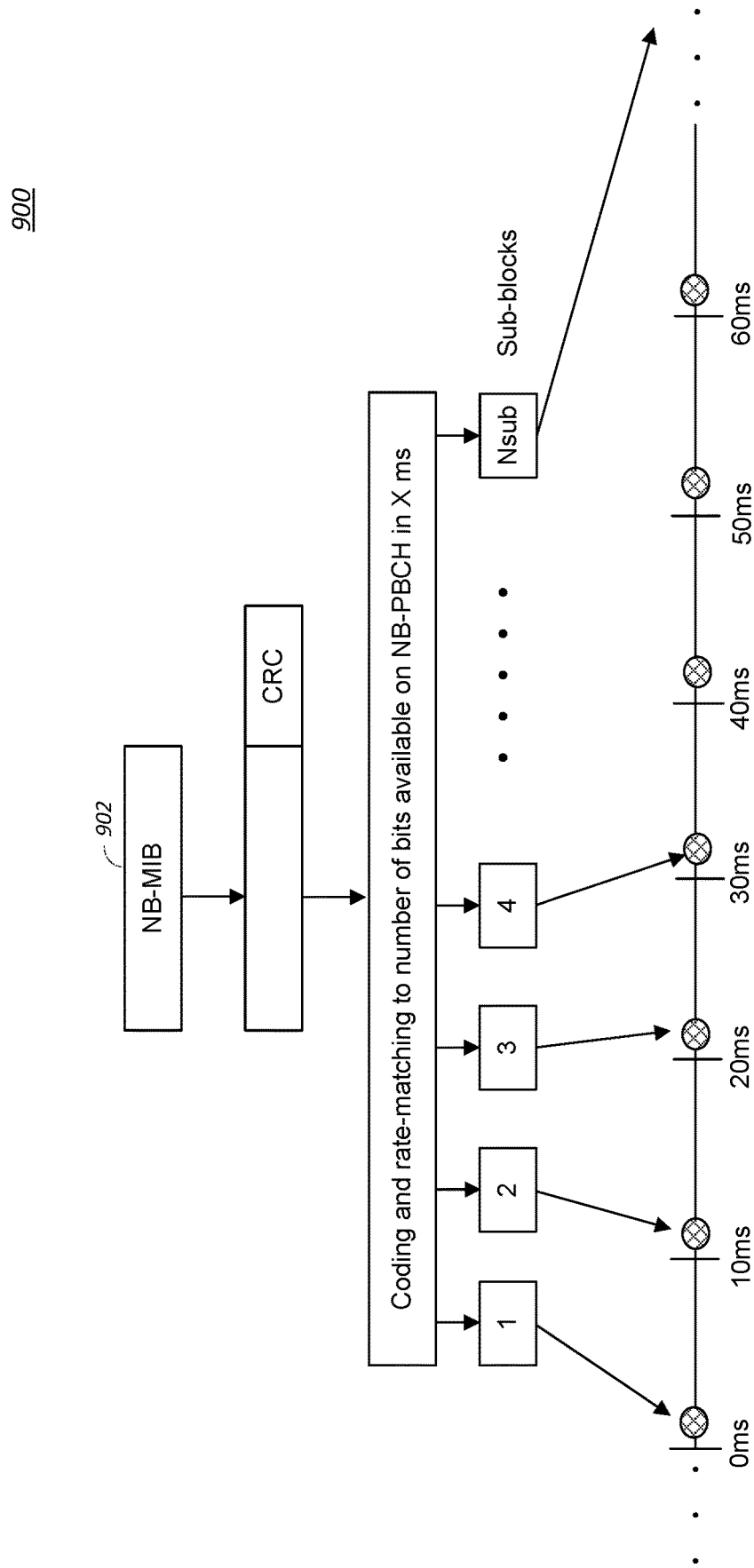
FIG. 9 is a diagram of an example sub-block transmission of narrowband master information block (NB-MIB).

FIG. 9 depicts an example sub-block transmission 900 of NB-MIB 902. The NB-MIB 902 may include a plurality of sub-blocks. The plurality of sub-blocks may be transmitted in a time window. For example, a (e.g., each) sub-block may be transmitted with a predetermined time period.

Each of the Nsub sub-blocks may be transmitted with repetition. A number of repetitions may be determined based on the number of repetition of NB-sync. The number of repetitions may be determined based on a mode of operation.

A time and/or frequency location of a NB-PBCH may be determined (e.g., based on the time/frequency location of NB-sync). For example, the same frequency location of NB-sync may be used for NB-PBCH and/or the time location of NB-PBCH may be determined (e.g., defined or configured) with an offset from the time location of NB-sync.

An offset between NB-sync and NB-PBCH may be determined based on a physical cell-ID. The physical cell-ID may be detected from NB-sync. A collision of NB-PBCH between one or more neighbor cells may be avoided using the offset.

The offset may be determined based on a mode of operation.

The offset may be determined based on a system bandwidth. The system bandwidth may include the NB-IoT bandwidth. The NB-IoT bandwidth may be considered as stand-alone and/or guard-band operation.

One or more Nsub sub-blocks may be transmitted with a predetermined sequence. The predetermined sequence may indicate one or more system parameters. For example, one or more coded bits of a NB-MIB may be split into Nsub sub-blocks. A sub-block may be decodable. The NB-MIB may be decodable when one or more (e.g., all) Nsub sub-blocks are aggregated. A WTRU may determine one or more system parameters. The WTRU may determine the one or more system parameters based on a transmission sequence of the one or more Nsub sub-blocks (e.g., within a transmission window).

The transmission sequence of the one or more Nsub sub-blocks may be based on one or more permutation sequences. The one or more permutation sequences may have a Nsub length.

For example, a first permutation sequence (e.g., such as [1 2 3 ... Nsub]) and/or a second permutation sequence (e.g., such as [Nsub Nsub−1 ... 3 2 1]) may be used as transmission sequence candidates. A bit system parameter may be indicated based on the permutation sequence used. The first permutation sequence may indicate a first mode of operation. The first mode of operation may include in-band operation. The second permutation sequence may indicate a second mode of operation. The second mode of operation may include stand-alone operation and/or guard-band operation.

In another example, Np permutation sequences may be used as transmission sequence candidates. One or more bit system parameters (e.g., such as $\lfloor \log_2 Np \rfloor$) may be indicated based on the Np permutation sequences. A mode of operation (e.g., in-band, guard-band, or stand-alone) may be indicated based on a transmission sequence used. A duplex mode (e.g., TDD or FDD) may be indicated based on a transmission sequence used. A system bandwidth (e.g., 3, 5, 10, 15, 20 MHz) may be indicated based on a transmission sequence used. A full or partial system frame number (SFN) may be indicated based on a transmission sequence used. A number of antenna ports may be indicated based on a transmission sequence used. A number of narrowbands may be indicated based on a transmission sequence used. Scheduling information of a NB-SIB1 transmission may be indicated based on a transmission sequence used.

In another example, Nsub sub-blocks may be transmitted with a predetermined sequence. The Nsub sub-blocks may indicate one or more NB-MIB contents. For example, system parameters included in the NB-MIB may be determined based on the transmission sequence used for the Nsub sub-blocks. A first set of system parameters may be included in the NB-MIB if a first permutation sequence is used. A second set of system parameters may be included in the NB-MIB if a second permutation sequence is used. The first set of system parameters and the second set of system parameters may overlap (e.g., partially overlap). The first set of system parameters may be associated with a first mode of operation. The first mode of operation may be an in-band mode of operation. The second set of system parameters may be associated with a second mode of operation. The second mode of operation may be a stand-alone mode of operation and/or a guard-band mode of operation. The number of antenna port may be a system parameter indicated in both first and second sets of system parameters. The first set of system parameters may include a system bandwidth.

Figure 10:
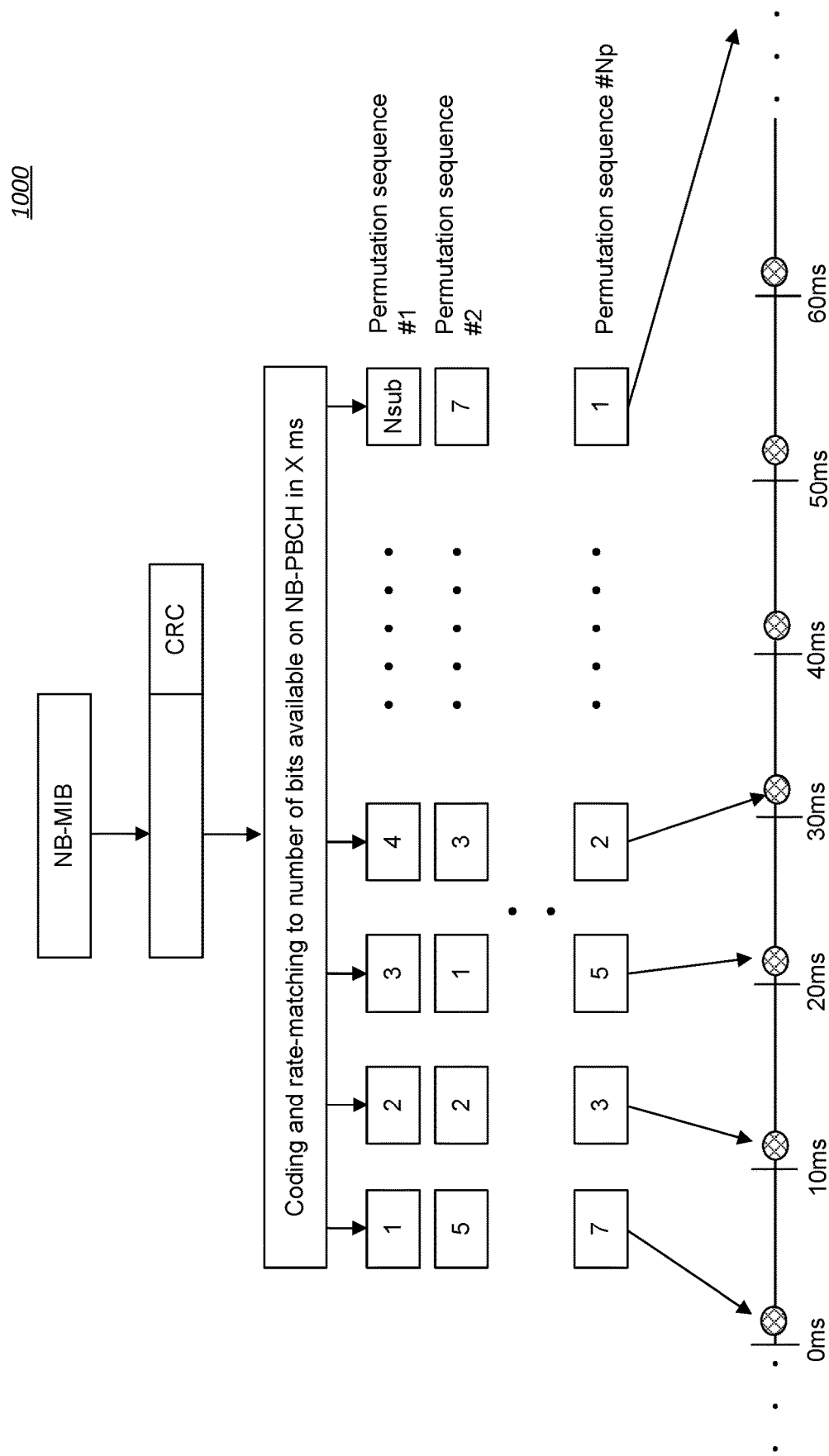
FIG. 10 is a diagram of an example of a plurality of permutation sequences for sub-blocks.

FIG. 10 depicts an example of a plurality of permutation sequences 1000 for sub-blocks. For example, the plurality of permutation sequences for Nsub sub-blocks may indicate one or more system parameters and/or NB-MIB contents.

One or more downlink control channels may be used for narrowband operation. A downlink control channel type may be determined based on a reference signal type used for demodulation (e.g., such as CRS, demodulation reference signal (DM-RS), and/or antenna port). A downlink control channel type may be determined based on a resource location within a subframe and/or an E-subframe. The resource location may include one or more resource elements used in a PDCCH (e.g., legacy PDCCH) region and/or one or more resource elements used in a PDSCH (e.g., legacy PDSCH) region. A downlink control channel type may be determined based on a resource element group (REG) type. The REG type may include REG type-1 and/or REG type-2. REG type-1 may comprise N1 REs. REG type-2 may comprise N2 REs. A downlink control channel type may be determined based on a control channel element (CCE) type used.

One or more E-subframe types may be used for narrowband operation. For example, a localized E-subframe type and/or a distributed E-subframe type may be used. The localized E-subframe type may be an E-subframe in which one or more subframes associated with (e.g., belongs to, or corresponds to) the E-subframe may be in a same frequency location (e.g., a same PRB index). The distributed E-subframe type may be an E-subframe in which one or more associated subframes may be in a different frequency location (e.g., a different PRB index).

An E-subframe type may be determined based on a mode of operation. For example, one or more (e.g., three) modes of operation may be used. The one or more modes of operation may include a first mode of operation, a second mode of operation, and/or a third mode of operation. The one or more modes of operation may be received from (e.g., indicated in) at least one of a synchronization channel, a broadcasting channel (e.g., MIB and/or SIB), a RRC signaling, and/or a downlink control channel (e.g., DCI).

The first mode of operation may comprise a stand-alone mode of operation. The second mode of operation may comprise a guard-band mode of operation. The third mode of operation may comprise an in-band mode of operation.

An E-subframe type for a NB-PDSCH may be determined. An E-subframe type for a NB-PDSCH may be determined based on an indication in an associated DCI. For example, an NB-PDSCH may be scheduled by an associated NB-PDCCH and/or NB-EPDCCH. The E-subframe type of the NB-PDSCH may be received from the associated downlink control channel. NB-PDCCH and/or NB-EPDCCH may be interchangeably used with NB-(E)PDCCH.

An E-subframe of a NB-(E)PDCCH and the E-subframe for the associated NB-PDSCH may be different.

An E-subframe type may be determined based on information (e.g., information type) carried in the E-subframe. For example, an E-subframe carrying unicast traffic may be determined as a localized E-subframe type. An E-subframe carrying broadcasting traffic may be determined as a distributed E-subframe type.

The frequency location (e.g., a PRB index) for one or more subframes in a distributed E-subframe type may be determined based on at least one of system parameters (e.g., such as physical cell-ID, system bandwidth, subframe number, SFN number, E-subframe number, and/or E-frame number).

A NB-PDCCH may use one or more first $N_{PDCCH}$ symbols in each subframe. For example, the NB-PDCCH may use the one or more first $N_{PDCCH}$ symbols in each subframe within an E-subframe. One or more of following may apply.

The one or more first $N_{PDCCH}$ symbols in each subframe may comprise a NB-PDCCH resource. The $N_{PDCCH}$ may comprise a predefined number used for one or more (e.g., all) subframes. The $N_{PDCCH}$ may be configured by higher layer signaling. The $N_{PDCCH}$ may be signaled according to the traffic type. For example, one or more $N_{PDCCH}$ values may be signaled (e.g., separately signaled) for unicast traffic, paging, re-authorization request (RAR), and/or system information update. The $N_{PDCCH}$ may be configured (e.g., configured separately) according to the search space. For example, a fixed and/or a predefined value of $N_{PDCCH}$ may be used for a common search space. A configured value of $N_{PDCCH}$ may be used for a WTRU-specific search space.

The $N_{PDCCH}$ may be determined based on an E-subframe type. For example, $N_{PDCCH}$ may be configured and/or predefined for a localized E-subframe type and a distributed E-subframe type (e.g., separately). In another example, if $N_{PDCCH}$ is determined for a localized E-subframe, an offset may be used based on $N_{PDCCH}$ for a distributed E-subframe (e.g., $N_{PDCCH}$+offset). The offset may comprise a frequency retuning time. The $N_{PDCCH}$ may be determined based on a subframe number within an E-subframe. The $N_{PDCCH}$ may be determined based on an available number of REs within the NB-PDCCH resources.

A NB-EPDCCH and/or NB-PDCCH may use $N_{EPDCCH}$ symbols from $N_{START}$ symbols in each subframe. The $N_{START}$ may be considered as a starting OFDM symbol of $N_{EPDCCH}$ symbols in a subframe. The $N_{EPDCCH}$ symbols starting from $N_{START}$ symbol in each subframe may comprise a NB-EPDCCH resource. The $N_{EPDCCH}$ may be determined based on $N_{START}$ value, or vice versa. The $N_{START}$ may be a predefined number used for one or more (e.g., all) subframes. The $N_{START}$ may be configured by higher layer signaling. The $N_{START}$ may be signaled according to the traffic type. For example, one or more $N_{START}$ values may be signaled (e.g., separately signaled) for unicast traffic, paging, RAR, and/or system information update. The $N_{START}$ may be configured (e.g., configured separately) according to the search space. For example, a fixed and/or a predefined value of $N_{START}$ may be used for a common search space. A configured value of $N_{START}$ may be used for a UE-specific search space. The $N_{START}$ may be determined based on E-subframe type. For example, $N_{PDCCH}$ may be configured and/or predefined for a localized E-subframe type and/or a distributed E-subframe type (e.g., separately). The $N_{START}$ may be determined based on a subframe number within an E-subframe. The $N_{START}$ may be determined based on an available number of REs within the NB-EPDCCH resources.

One or more associated antenna ports (e.g., reference signals) for an NB-(E)PDCCH may be determined based on a mode of operation. For example, in a first mode of operation (e.g., stand-alone), an associated reference signal for NB-EPDCCH may include a DM-RS (e.g., antenna ports 7-10). An associated reference signal for NB-PDCCH may include a CRS (e.g., antenna ports 0-3). In a third mode of operation (e.g., in-band operation) an associated reference signal for NB-EPDCCH may include both DM-RS and CRS.

A WTRU in a first mode of operation may receive (e.g., attempt to decode) an NB-EPDCCH with an associated DM-RS (e.g., an associated DM-RS only) although CRS may be located in the same PRB.

A WTRU in a third mode of operation may receive an NB-EPDCCH with an associated DM-RS and/or CRS (e.g., which may be located in the same PRB). A same number of antenna ports may be used for DM-RS and/or CRS. If a number of DM-RS ports associated with NB-EPDCCH is Np, the Np CRS ports may be configured (e.g., determined or used) at least in the same PRB. The number of CRS ports for the PRB used for a NB-IoT WTRU and a number of CRS ports for the PRB used for an LTE (e.g., a legacy LTE) WTRU may be different.

A WTRU may determine that a pre-coder may be used for a first DM-RS port and/or a first CRS port (e.g., within at least the same PRB). For example, one or more associated DM-RS ports for NB-EPDCCH may include antenna port 7 and/or 9, and the CRS located in the same PRB may include antenna port 0 and/or 1. A WTRU may determine that antenna port 7 and/or antenna port 0 may be the same and/or that antenna port 9 and/or antenna port 1 may be the same.

A WTRU in a second mode of operation may behave the same as in a WTRU in a first mode of operation.

One or more associated antenna ports may be received from (e.g., indicated in) a higher layer signaling. For example, one or more DM-RS ports may be associated with an NB-EPDCCH (e.g., as a default). A higher layer signaling may indicate that one or more CRS ports located within the same PRB may be used for NB-EPDCCH demodulation.

The higher layer signaling may include a broadcasting channel which may include NB-EPDCCH configuration information.

One or more DM-RS ports may be associated with a NB-EPDCCH. DM-RS ports may be used interchangeably herein with reference signals for NB-EPDCCH, RS for narrowband operation, RS for NB-IoT, and/or NB-RS.

A UCI transmission may comprise HARQ-ACK information (e.g., a HARQ-ACK and/or a HARQ-NACK). If a UCI transmission on a PUSCH is used for the HARQ-ACK information (e.g., instead of a dedicated uplink control channel such as the PUCCH), a (E)PDCCH may be utilized to grant UL resources for each HARQ-ACK information transmission. Granting UL resources for each HARQ-ACK information transmission may result in inefficient UL resource utilization. A UCI transmission on a PUSCH may use one PRB-pair as a minimum allocation for a WTRU. Using one PRB-pair for transmission of 1-bit HARQ-ACK information may waste UL resources significantly since the one PRB-pair may be capable of carrying significantly more than 1-bit of information. Different (e.g., more efficient) UCI transmission schemes may be utilized, for example, for a NB-IoT system.

For example, HARQ-ACK information corresponding to a downlink data transmission (e.g., PDSCH) may be transmitted using an uplink reference signal or a sequence. A reference signal such as an uplink reference signal may, for example be a sequence. An eNodeB may transmit, for example to a WTRU, a first downlink data transmission. The WTRU may receive the first downlink data transmission, for example via a PDSCH. The WTRU may determine to send a HARQ-ACK in response to receipt of the downlink data transmission, for example to the eNodeB. The eNodeB may transmit, for example to the WTRU, a second downlink data transmission. The WTRU may not correctly receive the second downlink data transmission. The WTRU may determine to send a HARQ-NACK on a condition that the second downlink data transmission is not correctly received. The WTRU may transmit an uplink reference signal and/or a sequence. The HARQ-ACK and/or HARQ-NACK may be indicated via the uplink reference signal and/or the sequence. For example, the HARQ-ACK in response to receipt of the first downlink data transmission may be indicated using a first uplink reference signal and/or a first sequence of the first uplink reference signal. The HARQ-NACK may be indicated using a second uplink reference signal (or a second sequence). A WTRU may receive the downlink data transmission in a first subframe (e.g., an E-subframe). The WTRU may send the uplink reference signal and/or the first sequence in a second subframe (e.g., an E-subframe). The second subframe may be later than the first subframe. For example, if a WTRU receives a PDSCH in a subframe (e.g., an E-subframe), the corresponding HARQ-ACK information may be transmitted with an uplink reference signal in a later subframe (e.g., a later E-subframe). If no PUSCH is scheduled for the subframe carrying the corresponding HARQ-ACK information, the uplink reference signal may be transmitted without PUSCH. The uplink reference signal may comprise one or more of a demodulation reference signal (DM-RS) and/or a sounding reference signal (SRS). The terms uplink reference signal (ULRS), uplink DM-RS, DM-RS, and/or SRS may be used interchangeably herein and examples described with respect to one type of reference signal may be equally applicable to other types of reference signals. One or more sequences of an uplink reference signal may be associated with a HARQ-ACK information such as an ACK and/or a NACK. For example, a first sequence of an uplink signal (e.g., an uplink reference signal) may be associated with an ACK and a second sequence of the uplink signal may be associated with a NACK. Thus, an ACK or a NACK may be signaled using a corresponding uplink signal sequence. HARQ-ACK and ACK may be used interchangeably and HARQ-NACK and NACK may be used interchangeably herein.

An uplink reference signal, an uplink signal, a sequence, a sequence of an uplink signal, a sequence of an uplink reference signal, a reference signal sequence, a Zadoff-Chu sequence, an uplink HARQ-ACK sequence, and/or an uplink HARQ-ACK information sequence may be used interchangeably herein. One or more sequences may use the same base sequence. One or more sequences may be differentiated by a cyclic shift (e.g., a cyclic shift index). For example, a first sequence and a second sequence may use the same base sequence with a different cyclic shift and/or cyclic shift index.

A WTRU may indicate HARQ-ACK information using a cyclic shift index of a sequence (e.g., a base sequence). A sequence may be a Zadoff-Chu sequence. For example, one or more cyclic shift indices that may be indicated using an uplink reference signal and/or sequence may be used to transmit or indicate HARQ-ACK information (e.g., an ACK or a NACK). For example, an uplink reference signal sequence may be transmitted using a first cyclic shift index to indicate an ACK. An uplink reference signal sequence may be transmitted using a second cyclic shift index to indicate a NACK. A cyclic shift and a cyclic shift index may be used interchangeably herein.

Transmission of an uplink reference signal using a cyclic shift, for example from a set of one or more cyclic shifts, in one or more PRBs may be associated with a downlink transmission. A WTRU may select a cyclic shift index from the one or more cyclic shift indices. A given cyclic shift index may indicate ACK or NACK for the corresponding downlink transmission. An eNodeB may determine one or more cyclic shift indices to use for HARQ-ACK information. The eNodeB may indicate, to the WTRU, one or more cyclic shift indices that may be used for HARQ-ACK information. The eNodeB may indicate the one or more cyclic shift indices via downlink control information (DCI), for example using one or more bits. For example, an eNodeB may indicate, to the WTRU, a first cyclic shift index to be used for HARQ-ACK. The eNodeB may indicate, to the WTRU, a second cyclic shift index to be used for HARQ-NACK. The WTRU may receive the DCI that indicates the first cyclic shift index to be used for HARQ-ACK and/or the second cyclic shift index to be used for HARQ-NACK. A cyclic shift index may be applied to one or more reference signals, for example across one or more uplink symbols that may be SC-FDMA symbols, in order to indicate the HARQ-ACK information. For example, a WTRU may transmit one or more uplink reference signals using a cyclic shift (e.g., a same or a different cyclic shift) to indicate an ACK or a NACK for an associated PDSCH. The one or more uplink reference signals may be transmitted in one or more uplink symbols.

One or more cyclic shift indices of an uplink reference signal may include a cyclic shift index ($\alpha$) for a Zadoff-Chu sequence $\bar{r}_{u,v}$ with code group u and base sequence v.

A WTRU may transmit the uplink reference signal for a HARQ-ACK information transmission over one or more uplink symbols (e.g., SC-FDMA symbols). The number of uplink symbols used for the HARQ-ACK information transmission may be determined, for example by a WTRU, based on the number of HARQ-ACK information bits. For example, one HARQ-ACK information bit may be transmitted in one uplink symbol and two HARQ-ACK information bits may be transmitted in two uplink symbols (e.g., one HARQ-ACK information bit per uplink symbol). If multiple uplink symbols are used, two or more consecutive uplink symbols may be used. A WTRU may determine a number of uplink symbols to be used for the HARQ-ACK information transmission, for example, based on a higher layer signaling. The number of uplink symbols used for the HARQ-ACK information transmission may be determined based on an indicator in an associated downlink control channel. The number of uplink symbols used for the HARQ-ACK information transmission may be determined based on a number of codewords (e.g., or transport blocks) for the associated PDSCH transmission. A sequence with a cyclic shift index may be transmitted over one or more uplink symbols. A length of an orthogonal cover code (OCC) may be determined based on the number of uplink symbols used.

A set of cyclic shift indices may be determined based on the number of HARQ-ACK information bits. For example, if a single HARQ-ACK information bit is transmitted, two cyclic shift indices may be associated with a downlink transmission. As another example, when two HARQ-ACK information bits are transmitted, four cyclic shift indices may be associated with a downlink transmission.

A set of cyclic shift indices may be determined based on a number of codewords transmitted for a PDSCH. For example, if a single codeword is transmitted for the PDSCH, the associated HARQ-ACK information transmission may be signaled using one of two cyclic shift indices. As another example, when two or more codewords are transmitted for the PDSCH, the associated HARQ-ACK information transmission may be signaled using one of four or more cyclic shift indices.

A set of cyclic shift indices may be determined based on the number of antenna ports used at a transmitter. The transmitter may comprise a transmitting WTRU. For example, if two antenna ports are used for HARQ-ACK information transmission, two sets of two cyclic shift indices may be used. A first set of the two cyclic shift indices may be used to indicate ACK. A second set of the two cyclic shift indices may be used to indicate NACK. Each cyclic shift index in a determined set may be associated with each antenna port.

An offset of two or more cyclic shift indices may be used for HARQ-ACK information transmission. For example, an offset between a first cyclic shift index and a second cyclic shift index may determine HARQ-ACK information (e.g., ACK and/or NACK). Two sets of cyclic shift indices may be used for HARQ-ACK information transmission. A first set of the two sets of cyclic shift indices may be used to indicate ACK. A second set of the two sets of cyclic shift indices may be used to indicate NACK. The first cyclic shift index may be the same for ACK or NACK. The second cyclic shift may be determined based on the HARQ-ACK information (e.g., ACK and/or NACK). The first cyclic shift index may be transmitted via a first antenna port. The second cyclic shift index may be transmitted via a second antenna port.

A cyclic shift index may be used for HARQ-ACK information transmission for a single antenna port transmission. A set of cyclic shift indices may be used for HARQ-ACK transmission for a plurality of antenna ports. For example, a cyclic shift index may be used to indicate HARQ-ACK information (e.g., ACK or NACK) if a single antenna port is used. A set of cyclic shift indices may be used to indicate the HARQ-ACK information (e.g., ACK and/or NACK) if two or more antenna ports are used.

A cyclic shift index, a HARQ-ACK resource, a short PUCCH resource, and/or an orthogonal resource may be used interchangeably herein.

Ncyc may represent the number of cyclic shift indices for an uplink reference signal that may be used in a given PRB. A subset of the Ncyc cyclic shift indices may be used for HARQ-ACK information indication. The subset to use for HARQ-ACK information indication, for example the cyclic shift subset, may be provided and/or received in DCI for a PDSCH transmission.

The cyclic shift subset may be indicated using one or more values, bits, and/or parameters. For example, a first cyclic shift index of the cyclic shift subset may be indicated and the rest of the cyclic shifts in the cyclic shift subset may be determined based on an offset, for example a predefined offset, from the first cyclic shift index or based on a function of the first cyclic shift index. Each cyclic shift subset may be associated with a subset index and the subset index may be indicated. Cyclic shift indices for HARQ-ACK and HARQ-NACK may be indicated.

For example, Ncyc=8 may be used for HARQ-ACK information indication. The cyclic shift subset may be indicated in a DCI associated with a PDSCH transmission. Ncyc=8 and ceil(log 2(Ncyc)) bits may indicate the cyclic shift index (a) and/or a starting cyclic shift index for HARQ-ACK information transmission corresponding to the PDSCH transmission.

The cyclic shift index may be a cyclic shift group index or a cyclic shift subset index. The cyclic shift group index may be associated with a set of cyclic shift indices (e.g., for HARQ-ACK information transmission). For example, the cyclic shift group index may be associated with two cyclic shift indices within the Ncyc cyclic shift indices. A WTRU may transmit an uplink reference signal in a time/frequency resource with a first cyclic shift index to indicate ACK. A WTRU may transmit the uplink reference signal in the time/frequency resource with a second cyclic shift index to indicate NACK. Table 3 and Table 4 show examples of HARQ-ACK transmission using a cyclic shift group with and without orthogonal cover code (OCC). For example, if a WTRU receives a signaling bit '00' in an associated DCI for a PDSCH transmission, the WTRU may use cyclic shift 0 to indicate ACK and cyclic shift 5 to indicate NACK. The WTRU may use an OCC for two uplink reference signals which may be used for HARQ-ACK information transmission. The WTRU may determine which OCC to use based on the indication in a DCI (e.g., a DCI for an associated PDSCH transmission). For example, if a WTRU receives a signaling bit '00' in an associated DCI for a PDSCH transmission, the WTRU may use OCC [1 1].

TABLE 3

An Example Cyclic Shift Group with OCC for HARQ-ACK Transmission

| Signaling bit | Cyclic shift (α) group | OCC (w) |
|---|---|---|
| 00 | 0: ACK<br>5: NACK | [1 1] |
| 01 | 2: ACK<br>7: NACK | [1 −1] |
| 10 | 4: ACK<br>9: NACK | [1 1] |
| 11 | 6: ACK<br>11: NACK | [1 −1] |

TABLE 4

An Example Cyclic Shift Group without OCC for HARQ-ACK Transmission

| Signaling bit | Cyclic shift($\alpha$) group |
|---|---|
| 000 | 0: ACK<br>6: NACK |
| 001 | 1: ACK<br>7: NACK |
| 010 | 2: ACK<br>8: NACK |
| 011 | 3: ACK<br>9: NACK |
| 100 | 4: ACK<br>10: NACK |
| 101 | 5: ACK<br>11: NACK |
| 110 | — |
| 111 | — |

The cyclic shift index may be a starting cyclic shift index, for example for a set of cyclic shift indices to use for a HARQ-ACK information indication. A subsequent cyclic shift index, for example within the set of cyclic shift indices, may be determined as a function of the starting cyclic shift index. The subsequent cyclic shift index may be determined using an offset from the starting cyclic shift index. For example, if the starting cyclic shift index $\alpha=0$ which may be a first cyclic shift index, a second cyclic shift index may be $\alpha+n$ or $\alpha+n \mod N_{cyc}$. The value of 'n' may be predefined (e.g., n=4). The value of 'n' may be configured and/or indicated (e.g., dynamically). The terms cyclic shift index, cyclic shift group index, and/or starting cyclic shift index may be used interchangeably herein and examples described with respect to a cyclic shift index may be equally applicable to a cyclic shift group index and/or a starting cyclic shift index (and vice versa).

A cyclic shift index for an uplink reference signal may be indicated in an associated DCI for a PDSCH (e.g., carried on the PDCCH or another downlink control channel). HARQ-ACK information corresponding to the PDSCH may be indicated by one or more orthogonal cover codes (OCCs). Table 5 shows an example of indicating a cyclic shift to use when OCC is used to indicate HARQ-ACK information.

TABLE 5

An Example of OCC Group for HARQ-ACK Transmission

| Signaling bit | Cyclic shift ($\alpha$) | OCC (w) |
|---|---|---|
| 000 | 0 | [1 1]: ACK<br>[1 −1]: NACK |
| 001 | 6 | [1 1]: ACK<br>[1 −1]: NACK |
| 010 | 3 | [1 1]: ACK<br>[1 −1]: NACK |
| 011 | 4 | [1 1]: ACK<br>[1 −1]: NACK |
| 100 | 2 | [1 1]: ACK<br>[1 −1]: NACK |
| 101 | 8 | [1 1]: ACK<br>[1 −1]: NACK |
| 110 | 10 | [1 1]: ACK<br>[1 −1]: NACK |
| 111 | 9 | [1 1]: ACK<br>[1 −1]: NACK |

A cyclic shift index for an uplink reference signal may be indicated in an associated DCI for a PDSCH. HARQ-ACK information corresponding to the PDSCH may be indicated by transmitting an uplink reference signal in a subset of uplink reference signal (e.g., DM-RS) symbols.

For example, if two symbols (e.g., SC-FDMA symbols) are used for an uplink reference signal transmission, e.g., DM-RS transmission, a WTRU may transmit the uplink reference signal using the cyclic shift index in the first symbol. In an example, if the first symbol is used for the ACK/NACK indication, the WTRU may not transmit an uplink reference signal in the second symbol.

A first cyclic shift index indicated in a DCI for PUSCH may override a second cyclic shift index in an associated DCI for PDSCH that may indicate the cyclic shift to be used for HARQ-ACK information transmission. For example, if a PUSCH transmission is scheduled in the same subframe as would be used for HARQ-ACK information transmission corresponding to a PDSCH, the cyclic shift indicated by the PUSCH DCI may override the cyclic shift indicated for HARQ-ACK information in the PDSCH DCI. The first cyclic shift index may be used to determine the subset of cyclic shifts to indicate HARQ-ACK information. The second cyclic shift index may override and/or replace the first cyclic shift index.

A cyclic shift index, a cyclic shift group index, and/or a starting cyclic shift index to be used to indicate ACK/NACK may be determined implicitly based on one or more factors. For example, a cyclic shift index, a cyclic shift group index, and/or a starting cyclic shift index may be implicitly determined based on a PRB index and/or a starting PRB index within an E-subframe that is used for the PDSCH transmission corresponding to the ACK/NACK. A cyclic shift index, a cyclic shift group index, and/or a starting cyclic shift index may be implicitly determined based on a (E)CCE index, a starting (E)CCE index, and/or (E)CCE aggregation level of an associated (E)PDCCH for a PDSCH transmission. A cyclic shift index, a cyclic shift group index, and/or a starting cyclic shift index may be implicitly determined based on a WTRU-ID (e.g., C-RNTI, IMSI, s-TMSI).

A HARQ-ACK information transmission may be based on a UCI on PUSCH. A sub-RB resource allocation (e.g., in which the number of subcarriers (Msub) allocated for a WTRU may be equal to or smaller than Nsub, Msub≤Nsub) may be used for NB-IoT WTRUs. Nsub may equal 12, for example (e.g., one RB). The terms sub-RB, sub-PRB, single subcarrier, and/or single tone may be used interchangeably herein an examples described with respect to one of these terms may be equally applicable to one or more of the others. A legacy LTE uplink resource allocation may comprise a RB-based resource allocation. Uplink resource allocation granularity in the RB-based resource allocation may be based on Nsub subcarriers.

A RB based UCI on a PUSCH (e.g., with or without UL-SCH) may be expanded in the time domain. The RB based UCI on a PUSCH may be expanded in the time domain based on the number of subcarriers used for the UCI transmission (e.g., Msub). A channel mapping on a RE level of UCI on PUSCH may be expanded based on the number of subcarriers (e.g., Msub) allocated, determined, configured, and/or used for a sub-RB resource allocation of NB-PUSCH. For example, the UCI on PUSCH may be expanded over Ksub subframes. Ksub may be determined as a function of Msub and Nsub (e.g., Ksub=Nsub/Msub). The same channel coding and multiplexing as legacy system may be used.

Figure 11:
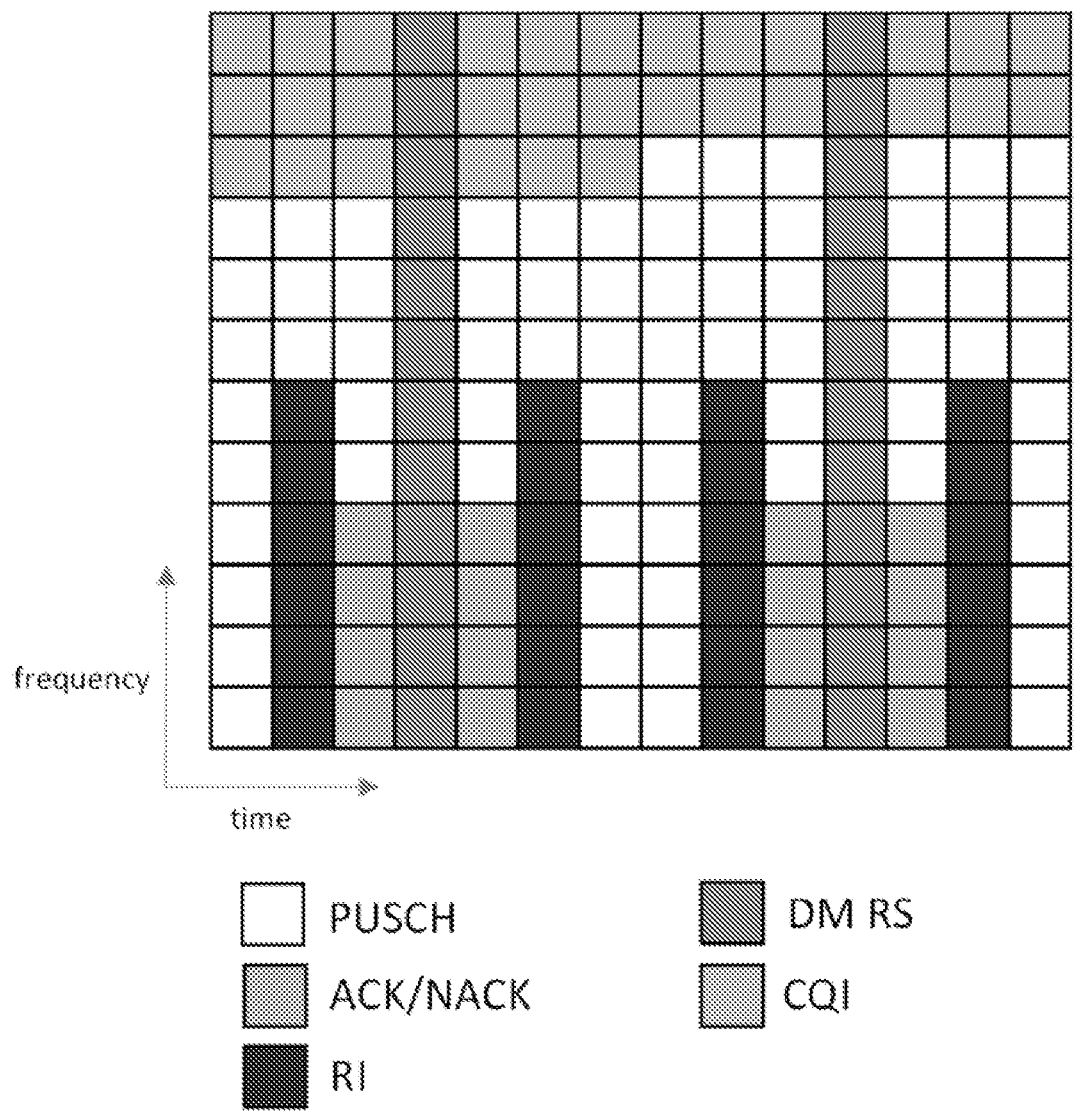
FIG. 11 is a diagram of an example time expansion of UCI on a PUSCH when Msub=Nsub.

FIG. 11 depicts an example UCI transmission 1100 on PUSCH when Msub=Nsub and Nsym=Msym (e.g., UCI transmitted in a single PRB-pair within a single subframe). A PRB-pair may comprise a subcarrier in the frequency domain and/or an SC-FDMA symbol in the time domain.

Figure 12:
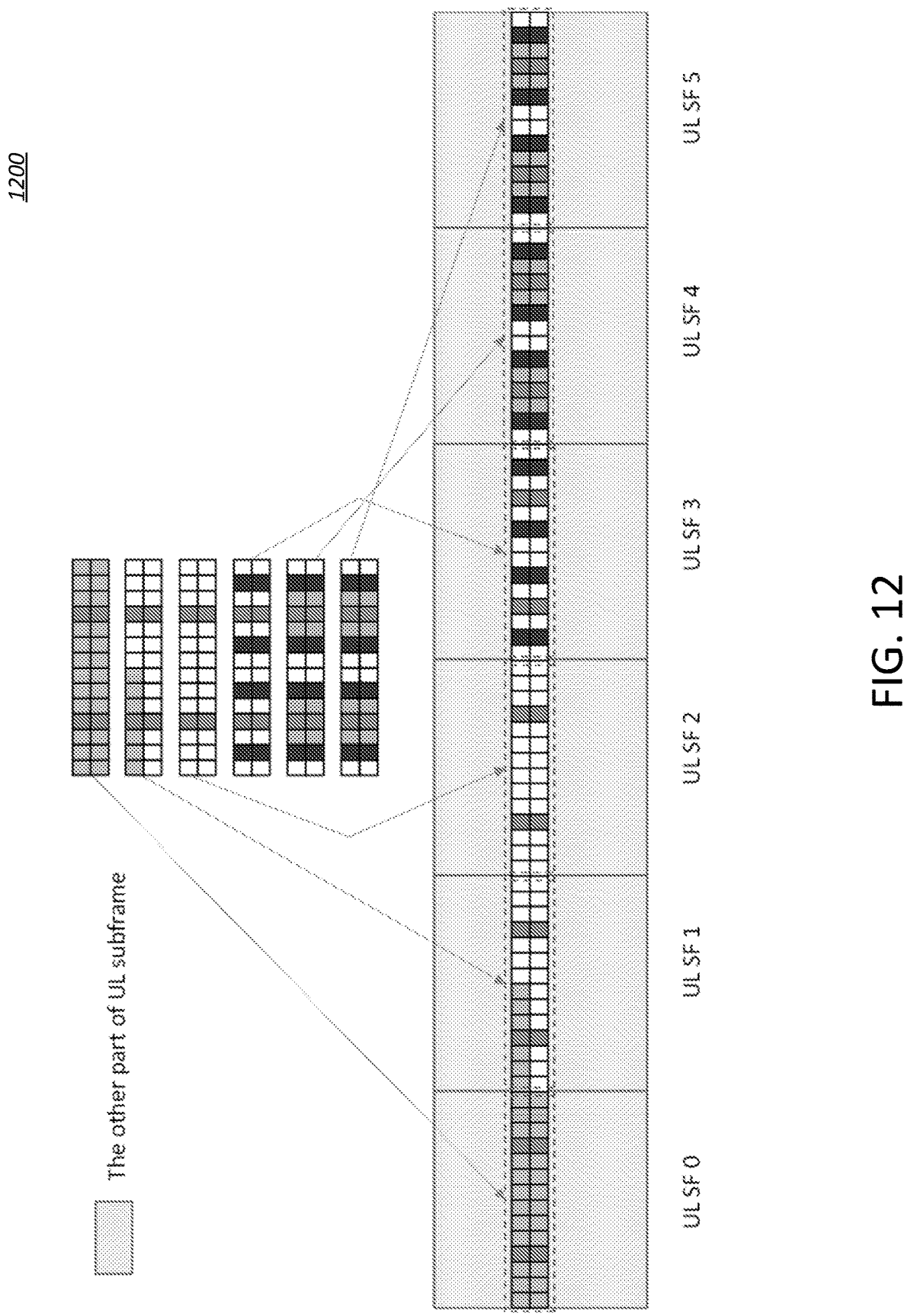
FIG. 12 is a diagram of an example time expansion of a UCI on a PUSCH when Msub<Nsub.

FIG. 12 depicts an example time expansion 1200 of UCI on PUSCH when Msub<Nsub. A PRB-pair (e.g., such as the PRB-pair shown in FIG. 11) may be split into two or more pieces in the frequency domain. For example, the PRB-pair may be split into six pieces in the frequency domain. The two or more pieces in the frequency domain may be sent over two or more subframes. For example, the six pieces in the frequency domain may be sent over six subframes.

If two subcarriers (e.g., Msub=2) are allocated for a WTRU from an associated NB-PDCCH, a RB (e.g., a single RB) may be divided into Ksub and/or two or more subcarriers including UCI for each subframe may be transmitted. For example, in the example shown in FIG. 12 two subcarriers are used for UCI transmission across 6 subframes in order to transmit a similar amount of UCI as was transmitted in a single subframe in FIG. 11 (e.g., Msub=2, Nsub=12, Ksub=6).

Figure 13:
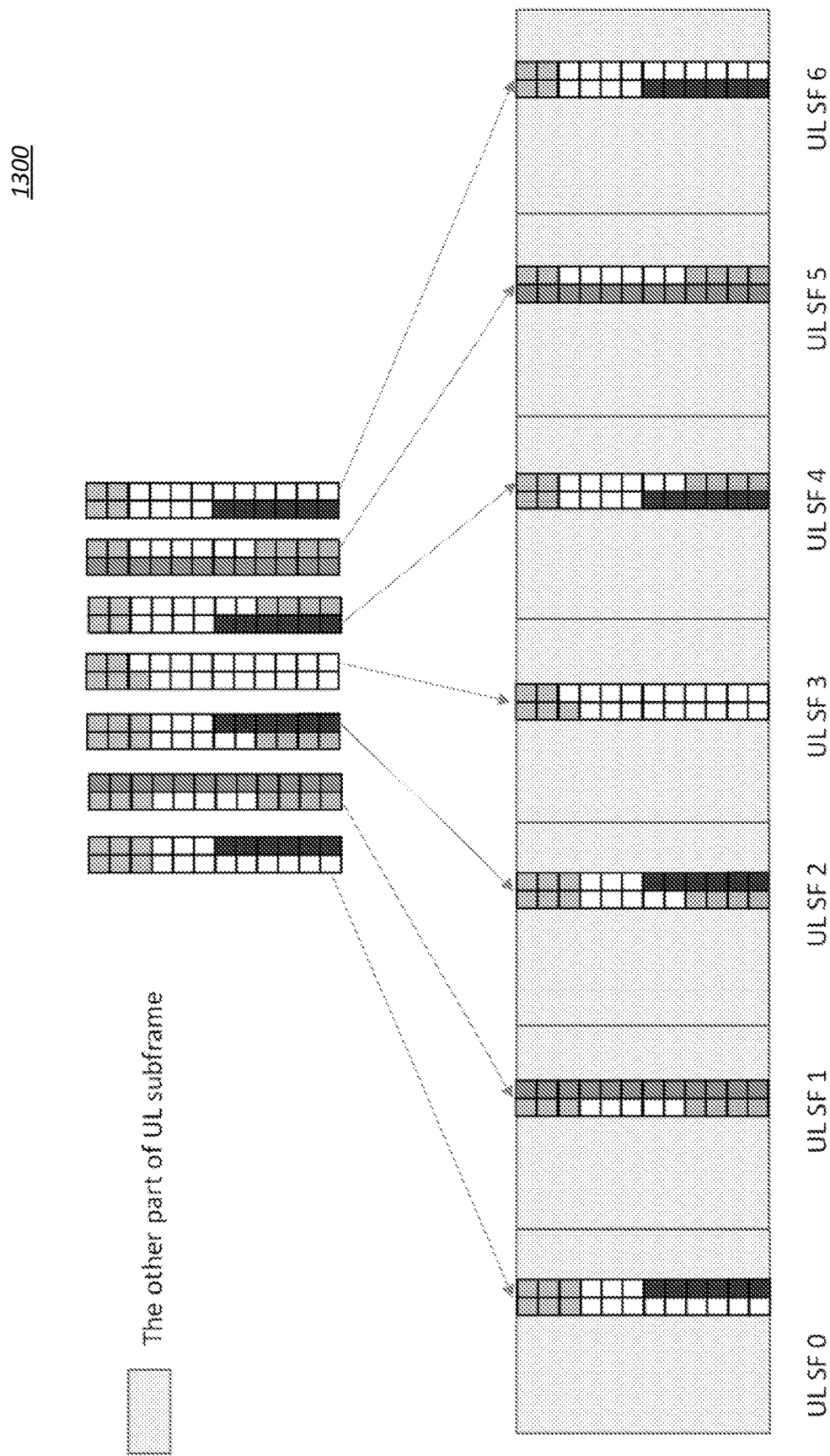
FIG. 13 is a diagram of an example time expansion of a UCI on a PUSCH when Msym<Nsym.

A RB based UCI on PUSCH (e.g., with or without UL-SCH) may be expanded in the time domain. The time domain expansion of the RB based UCI on PUSCH may be based on the number of symbols used (Msym) in a subframe for the UCI transmission. A channel mapping on a RE level of UCI on PUSCH may be expanded based on the number of symbols allocated, determined, configured, or used for NB-PUSCH. For example, the UCI on PUSCH may be expanded over Ksub subframes. Ksub may be determined as a function of Msym and/or Nsym (e.g., Ksub=Nsym/Msym). Nsym may be a predefined, configured, and/or variable number based on the number of symbols used in a subframe. Nsym may represent the number of symbols per subframe. For example, the value of Nsym may depend on whether an extended cyclic prefix is used (e.g., Nsym=12) or a normal cyclic prefix is used (e.g., Nsym=14). For example, in the example shown in FIG. 13 two symbols per subframe are used for UCI transmission across 12 subcarriers in order to transmit a similar amount of UCI as was transmitted in a single subframe in FIG. 11. In the example shown in FIG. 13, the time domain expansion may occur across 7 subframes (e.g., Msym=2, Nsym=14, Ksub=7). FIG. 13 depicts an example time expansion 1300 of UCI on PUSCH when Msym<Nsym.

HARQ-ACK information may be sent in an uplink pilot time slot (UpPTS). HARQ-ACK information may be transmitted in UpPTS in a special subframe(s) of TDD. For an NB-PDSCH transmission which may be finished in a subframe n, a UpPTS in a first special subframe after the subframe n+k may be used for HARQ-ACK information transmission. The variable 'k' may be a predefined number.

A UpPTS may be used for SRS transmission and/or a shortened RACH transmission. The shortened RACH transmission may be applicable (e.g., only applicable) for small cell. The shortened RACH transmission may not be used for a NB-IoT system. If a HARQ-ACK information transmission on UpPTS collides with a SRS transmission, the HARQ-ACK information transmission may be prioritized and/or the SRS transmission may be dropped.

One or more downlink E-subframes may be associated with a UpPTS. For example, one or more HARQ-ACK information bits from two or more E-subframes may be multiplexed within a UpPTS. The one or more HARQ-ACK information bits may be multiplexed in a FDM manner and/or a CDM manner. The one or more HARQ-ACK information bits may be bundled in a UpPTS resource. If two or more special subframes are used for an E-subframe, one or more HARQ-ACK information bits may be multiplexed over two or more UpPTSs in an E-subframe and/or a UpPTS of the two or more UpPTSs in the E-subframe may be used for a HARQ-ACK information transmission and/or the remaining UpPTSs of the two or more UpPTSs may be used for legacy WTRUs (e.g., SRS and/or shortened RACH).

Figure 14:
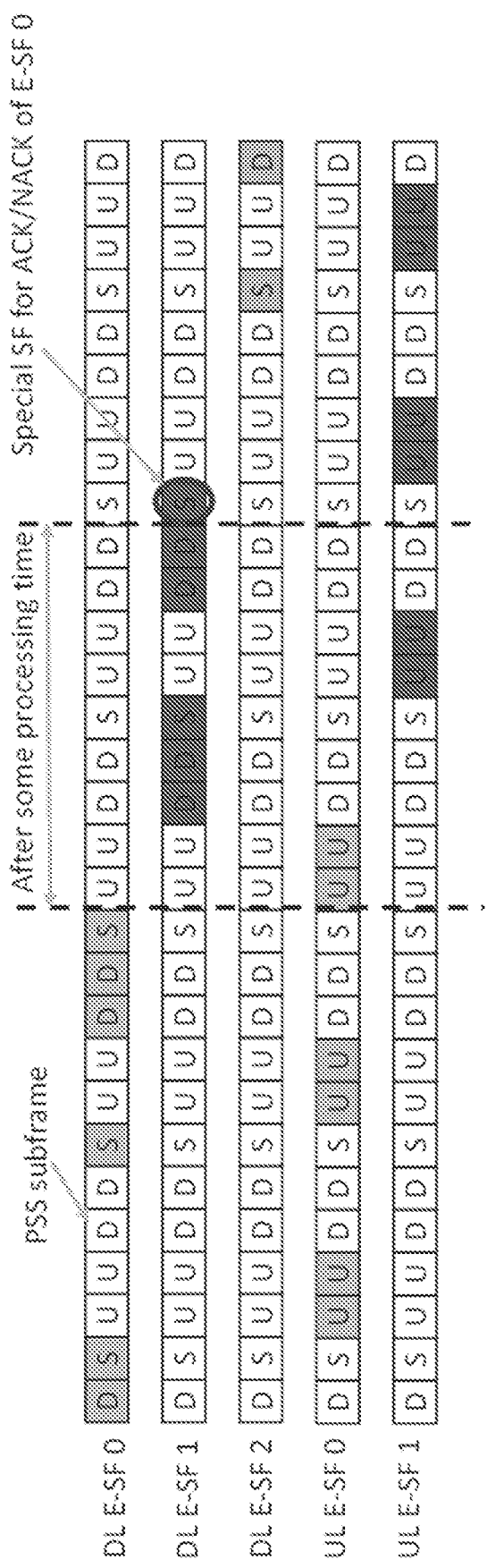
FIG. 14 is a diagram of an example HARQ-ACK transmission in an uplink pilot time slot (UpPTS).

FIG. 14 depicts an example HARQ-ACK information transmission 1400 in a UpPTS. A downlink E-subframe may comprise one or more (e.g., six) downlink subframes. The one or more downlink subframes may include a special subframe (e.g., where a TDD configuration 1 is assumed).

Figure 15:
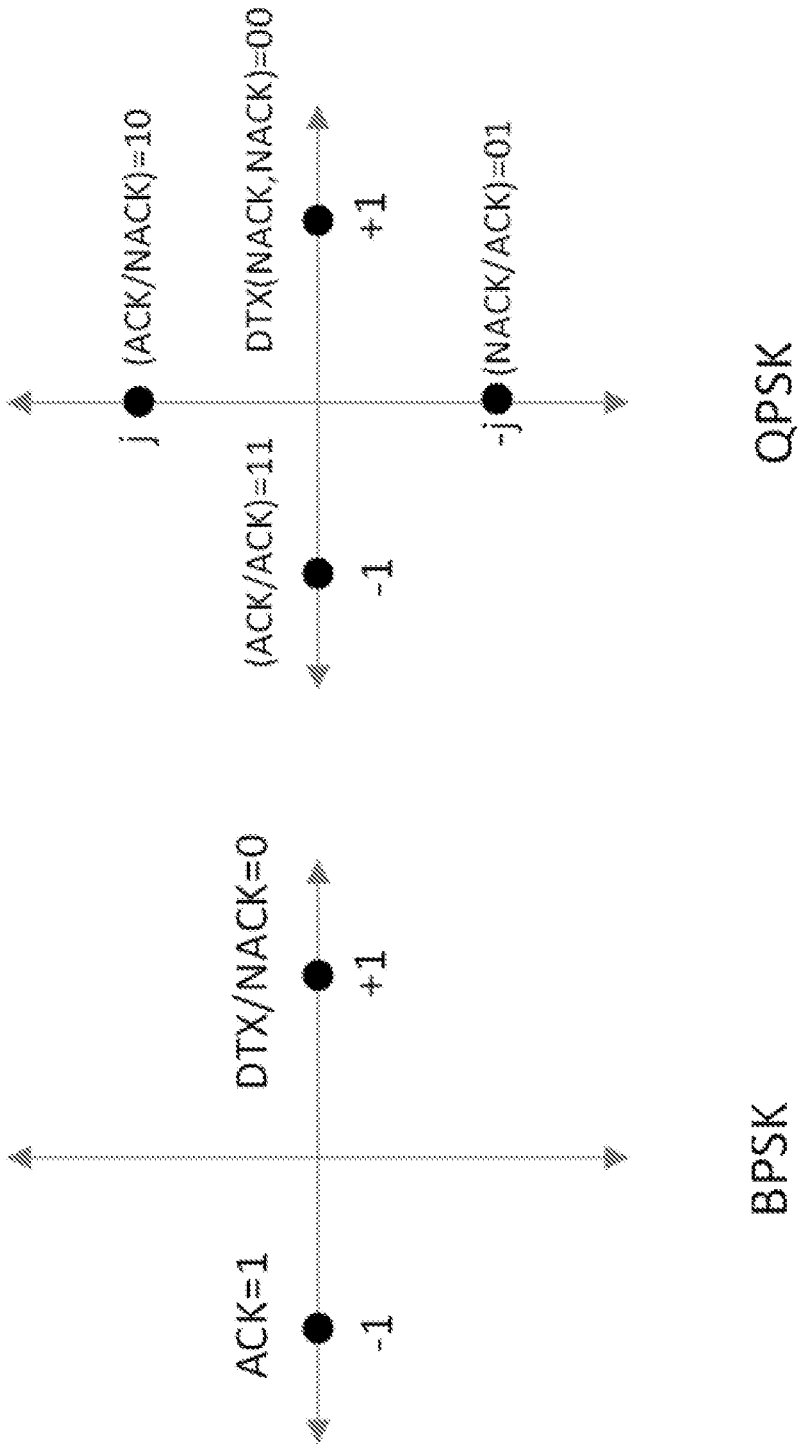
FIG. 15 is a diagram of an example modulation symbol for a HARQ-ACK transmission.

FIG. 15 depicts an example modulation symbol 1500 for a HARQ-ACK information transmission. A BPSK and/or QPSK may be used to carry ACK, NACK, and/or DTX information. BPSK may be used for a single HARQ-ACK information. QPSK may be used for multiple HARQ-ACK information. One or more E-subframes may be associated with a modulation symbol. If two E-subframes are associated with a modulation symbol, a first E-subframe may be associated with an imaginary part of the modulation symbol and/or a second E-subframe may be associated with a real part of the modulation symbol.

Figure 16:
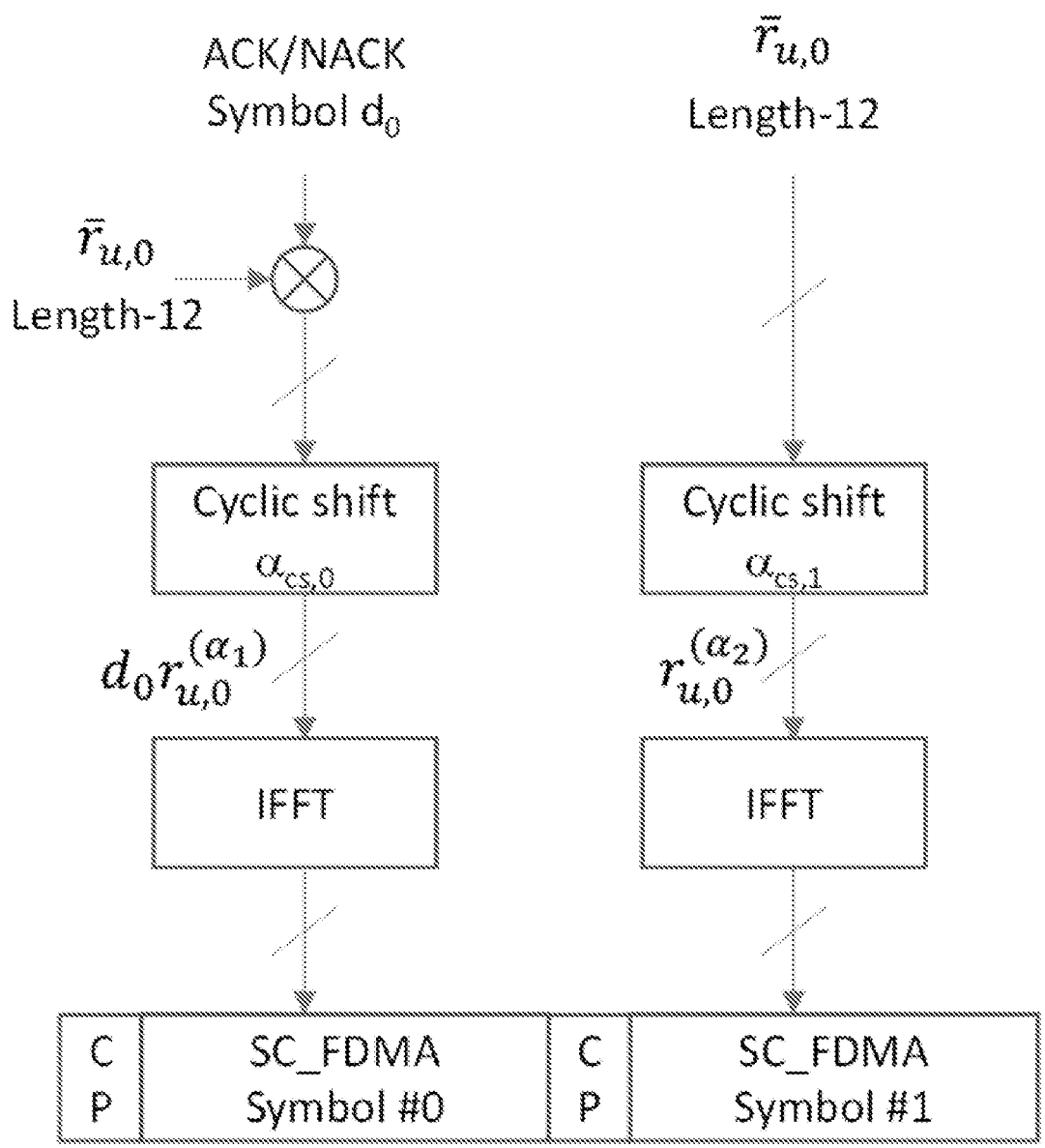
FIG. 16 is a diagram of an example HARQ-ACK channel in a UpPTS with two symbols.

FIG. 16 depicts an example HARQ-ACK channel 1600 in UpPTS with two symbols. One or more (e.g., one or two) symbols may be available for UCI in UpPTS. If two symbols are available, one or more HARQ-ACK information may be multiplexed with a cyclic shift index as shown in FIG. 16. A first symbol may be used for a reference signal. A second symbol may be used for HARQ-ACK information. If two symbols are not available within a UpPTS and/or a first E-subframe, an adjacent UpPTS in a special subframe of a second E-subframe may be combined (e.g., to construct the HARQ-ACK channel).

As shown in FIG. 16, d0 may be a symbol indicating HARQ-ACK information (e.g., a modulation symbol such as in the FIG. 15). $\bar{r}_{u,v}$ may represent the Zadoff-Chu sequence with a code group u and a base sequence v. $r_{u,v}^{(\alpha)}$ may represent a cyclic shift of $\bar{r}_{u,v}$.

Figure 17:
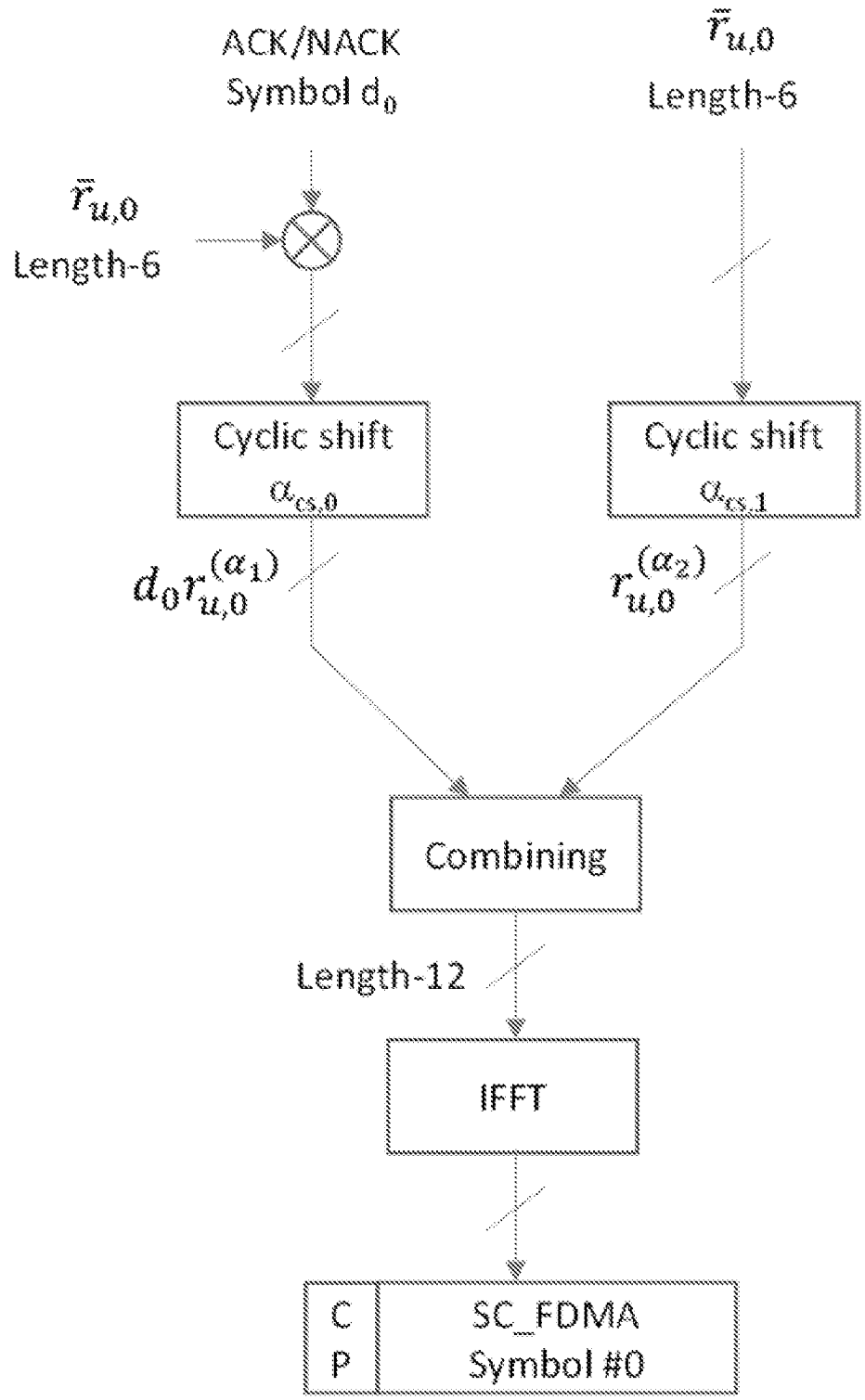
FIG. 17 is a diagram of an example HARQ-ACK channel in a UpPTS with one symbol.

FIG. 17 depicts an example HARQ-ACK channel 1700 in UpPTS with one symbol. If a symbol (e.g., a single symbol) is available for HARQ-ACK in UpPTS, a HARQ-ACK channel may be generated (e.g., constructed). A sequence based on Zadoff-Chu with a length of six may be used for the HARQ-ACK channel.

Figure 18:
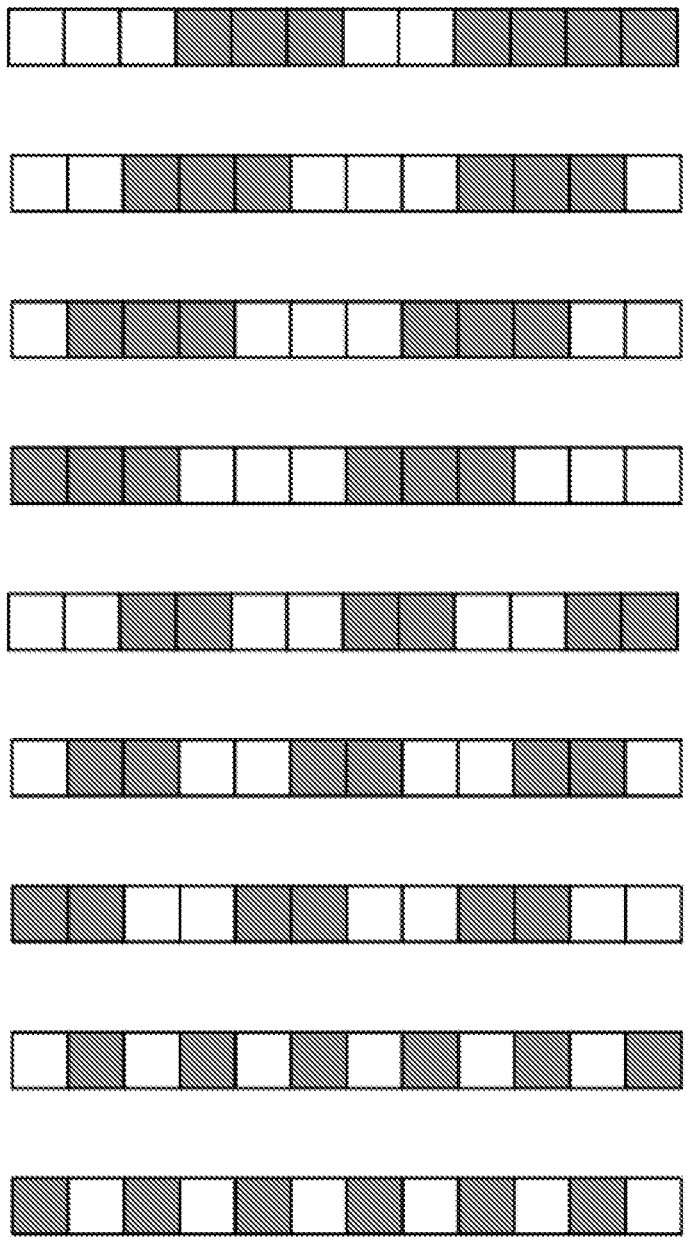
FIG. 18 is a diagram of an example HARQ-ACK information and RS multiplexing in a symbol.

FIG. 18 depicts an example of HARQ-ACK information and RS multiplexing 1800 in a symbol. A HARQ-ACK channel may be determined and/or used by multiplexing HARQ-ACK information and/or a reference signal within a symbol, where $\alpha_1$ and $\alpha_2$ may be the same as in FIG. 16 and/or FIG. 17.

A single-tone based HARQ-ACK information transmission may be used. One or more types of HARQ-ACK information transmission may be used (e.g., in an uplink transmission). A first HARQ-ACK information transmission may be based on a single subcarrier transmission. A second HARQ-ACK information transmission may be based on a multiple subcarrier transmission. The single subcarrier transmission may use one of a plurality of subcarriers in an uplink transmission. A subcarrier and/or a tone may be used interchangeably herein.

A HARQ-ACK information transmission type may be determined based on a PRACH resource used. For example, one or more PRACH resources may be configured. A PRACH resource of the one or more PRACH resources may be associated with a WTRU's capability for single-tone and/or multi-tone based transmission. A WTRU with a single-tone based transmission capability may determine a PRACH resource associated with the single-tone based transmission. A WTRU with a multi-tone based transmission capability may determine a PRACH resource associated with the multi-tone based transmission. The PRACH resource associated with the single-tone based transmission may be a single-tone based transmission. The PRACH resource associated with a multi-tone based transmission may be a multi-tone based transmission. The PRACH resource associated with the multi-tone based transmission may be a single-tone based transmission.

A HARQ-ACK information transmission type may be determined based on a mode of operation used. For example, a single-tone based HARQ-ACK information transmission may be used for a first mode of operation. A multi-tone based HARQ-ACK information transmission may be used for a second mode of operation. The mode of operation may correspond to one or more of an in-band mode, a guard-band mode, and/or a stand-alone mode. The mode of operation may be based on a coverage level. For example, one or more coverage levels may be used or defined. Each of the one or more coverage levels may be associated with a mode of operation. The first mode of operation may be a normal coverage mode of operation. The second mode of operation may be a coverage enhanced mode of operation. The mode of operation may be indicated in a downlink control channel associated with a downlink transmission (e.g., PDSCH).

A single-tone based uplink HARQ-ACK information transmission may comprise a tone index selection. For example, one or more tone indices may be determined for a single-tone based HARQ-ACK information transmission. The one or more tone indices may be determined based on an allocated downlink resource. For example, the one or more (e.g., two) tone indices associated with a single-tone based HARQ-ACK information transmission may be determined based on a first CCE index used for NB-PDCCH to schedule NB-PDSCH. The one or more tone indices associated with a single-tone based HARQ-ACK information transmission may be determined based on a first subframe and/or SFN index used for NB-PDCCH to schedule NB-PDSCH. The one or more tone indices associated with a single-tone based HARQ-ACK information transmission may be determined based on a WTRU-ID (e.g., C-RNTI, s-TMSI, etc.). The one or more tone indices associated with a single-tone based HARQ-ACK information transmission may be determined based on a first subframe and/or a SFN index used for NB-PDSCH.

When two or more indices are associated with a single-tone based HARQ-ACK information transmission, a WTRU may determine which tone to use for HARQ-ACK information transmission. The WTRU may determine which tone to use for HARQ-ACK information transmission based on an ACK and/or a NACK. For example, a first tone may be used to indicate ACK for an associated NB-PDSCH transmission. A second tone may be used to indicate NACK for the associated NB-PDSCH transmission. Tone and tone sequence may be used interchangeably herein.

One or more the tone indices for HARQ-ACK information transmission may be indicated via an associated NB-PDCCH used to schedule NB-PDSCH.

One or more narrowbands may be used for NB-IoT. The one or more narrowbands may correspond to a single PRB. A mode of operation for the one or more narrowbands may be determined, configured, and/or used. The mode of operation for the one or more narrowbands may be determined based on one or more narrowband frequency locations.

A mode of operation for each narrowband may be determined (e.g., configured).

A WTRU may receive, monitor, and/or attempt to decode one or more NB-Sync signals in one or more narrowband locations. The WTRU may determine a mode of operation for a (e.g., each) narrowband based on a NB-Sync channel received in the narrowband.

One or more narrowbands may be associated with a WTRU. The WTRU may determine a primary NB from the one or more detected, configured, and/or determined narrowbands. The primary NB may be determined based on a predetermined mode of operation.

If the one or more narrowbands are associated with more than one mode of operation, a narrowband of the one or more narrowbands may be determined and/or used as a primary NB. For example, a narrowband associated with in-band mode of operation (e.g., or stand-alone, or guard-band) may be determined and/or used as the primary NB.

A primary NB may be determined based on the NB in which physical random access channel (PRACH) preamble is transmitted. The primary NB may be determined based on a received random access response (RAR).

A WTRU may receive, monitor, and/or attempt to decode a NB-Sync signal for a primary narrowband.

One or more secondary narrowbands may be configured (e.g., via the primary narrowband).

A broadcasting channel (e.g., a MIB and/or a SIB) and/or a higher layer signaling may include configuration information of one or more secondary narrowbands. The configuration information may comprise full or partial configuration information.

A system bandwidth received in a broadcasting channel may determine (e.g., implicitly determine) the one or more secondary narrowbands.

A mode of operation of a (e.g., each) secondary narrowband of the one or more secondary narrowbands may be indicated (e.g., by the configuration information).

The one or more secondary narrowbands may be determined (e.g., assumed) as the mode of operation associated with the primary narrowband.

One or more primary narrowbands may be used. A primary narrowband of the one or more narrowbands may be used, configured, and/or determined for a mode of operation. For example, if two or more narrowbands with different modes of operation are used, the two or more narrowbands may be determined as primary narrowbands.

One or more primary narrowbands may be used, determined, and/or configured for a mode of operation.

One or more secondary narrowbands for a mode of operation may be configured by the one or more primary narrowbands with a same mode of operation.

A WTRU may use a single mode of operation. The WTRU may select a narrowband of the two or more narrowbands based on a higher signal strength of one or more NB-Sync channels (e.g., if a WTRU receives, detects, and/or determines two or more narrowbands with a different mode of operation). The WTRU may select a narrowband (e.g., from the two or more narrowbands) based on a higher received signal strength of a downlink reference signal (e.g., if a WTRU receives, detects, and/or determines two or more narrowbands with a different mode of operation).

The WTRU may select a narrowband (e.g., from the two or more narrowbands) based on a priority rule of the mode of operation. For example, a WTRU may detect two or more narrowbands. A first narrowband may be based on a first mode of operation. A second narrowband may be based on a second mode of operation. The WTRU may select the first narrowband and/or the second narrowband based on the priority rule. An in-band mode of operation may have a higher priority than a guard-band mode of operation. The priority rule may apply when a difference of signal strength associated with NB-Sync channels of the two or more narrowbands is within a predefined range (e.g., a predefined threshold).

Frequency hopping may be applied between two or more narrowbands. One or more narrowbands may be used for UL and/or DL transmission for a WTRU. The one or more narrowbands may use the same mode of operation and/or different modes of operation.

One or more narrowbands may be configured for a WTRU. One or more configured narrowband may be used at a time for UL and/or DL transmissions.

A narrowband location and/or index may be changed over time. The narrowband location and/or index may be determined based on downlink control information for scheduling. The narrowband location and/or index may be determined based on a predefined hopping pattern. The narrowband location and/or index may be determined based on a frequency hopping indication.

An intra-mode narrowband hopping may comprise narrowband hopping with same mode of operation narrowbands. An inter-mode narrowband hopping may comprise narrowband hopping across different mode of operation narrowbands. Narrowband hopping and frequency hopping may be used interchangeably herein.

An eNB and/or a WTRU may indicate an inter-mode narrowband hopping capability. For example, an eNB may indicate the support of inter-mode narrowband hopping and/or configuration of inter-mode narrowband hopping (e.g., via a higher layer signaling). A WTRU may indicate the capability of inter-mode narrowband hopping.

Time and/or frequency synchronization between two or more narrowbands with a different mode of operation may be determined based on an indication. The indication may include a configuration of inter-mode narrowband hopping support. A WTRU may determine (e.g., assume) that time and/or frequency are synchronized within narrowbands used (e.g., if inter-mode narrowband hopping is supported). The WTRU may determine (e.g., assume) that time and/or frequency are not synchronized within the narrowbands configured.

Intra-mode narrowband hopping and/or inter-mode narrowband hopping may be used for a WTRU.

A different retuning time may be used for the narrowband hopping. The different returning time may be determined according to the intra-mode narrowband hopping and/or inter-mode narrowband hopping. For example, when a narrowband location is changed from a first narrowband to a second narrowband, a first retuning time (T_re1) may be used if the first and the second narrowbands may be a same mode of operation. A second retuning time (T_re2) may be used if the first and the second narrowbands may be a different mode of operation. The first retuning time (T_re1) and the second retuning time (T_re2) may be different. The retuning time may be a predefined value. The returning time may be configured via a higher layer signaling. The retuning time may be determined based on a WTRU capability indication. The retuning time T_re1 may be used if frequency hopping is used between two or more narrowbands with same mode of operation (e.g., both narrowbands are in-band mode of operation). The retuning time T_re2 may be used if frequency hopping is used between two or more narrowbands with a difference mode of operation (e.g., a first narrowband is in-band mode of operation and a second narrowband is guard-band mode of operation). The retuning time may comprise a gap (e.g., a time gap in between narrowband hopping). The retuning time may be used by skipping a first UL and/or DL transmission. The returning time may be used by skipping an end of one or more UL and/or DL transmissions.

A transmission power (e.g., a different maximum transmission power) for uplink transmission may be used in association with a narrowband index. A first Pmax (e.g., Pmax,1) may comprise a maximum uplink transmission power in a narrowband with a first mode of operation. A second Pmax (e.g., Pmax,2) may comprise a maximum uplink transmission power in a narrowband with a second mode of operation. Pmax may comprise a predefined and/or a configured value for one or more (e.g., each) modes of operation. Pmax may be indicated in an associated DCI for uplink transmission.

An uplink (e.g., separate uplink) power control loop may be used according to the narrowband index and/or mode of operation of the narrowband. A first power control loop may be used for one or more narrowbands with a first mode of operation. A second power control loop may be used for one or more narrowbands with a second mode of operation.

An associated reference signal type may be determined (e.g., based on the narrowband index and/or mode of operation of the narrowband). An antenna port number may be determined (e.g., based on the narrowband index and/or mode of operation of the narrowband).

A timing advance value for an uplink transmission may be determined (e.g., based on the narrowband index and/or mode of operation of the narrowband).

A WTRU may perform a RACH process for one or more (e.g., each) modes of operation configured. The timing advance value may be determined, configured, and/or indicated for the one or more (e.g., each) mode of operation.

A measurement reference signal (e.g., or resource) may not been defined for NB-IoT WTRUs. For example, one or more subframes containing synchronization signals (e.g., a NB-Sync signal), may not include a reference signal available for NB-IoT WTRUs.

A NB-Sync signal may include one or more of a narrowband primary synchronization signal (NB-PSS) and/or a narrowband secondary synchronization signal (NB-SSS).

A WTRU may determine (e.g., measure and/or estimate) channel quality information (e.g., information associated with channel quality) based on one or more reference resources received. The one or more reference resources may include one or more of a reference signal for narrowband operation (e.g., NB-RS), a reference signal for legacy WTRU transmission and/or non-narrowband operation (e.g., CRS, DM-RS, CSI-RS), and/or a synchronization signal for narrowband operation (e.g., NB-Sync).

The determined channel quality information may be sent (e.g., reported or transmitted) in uplink periodically and/or aperiodically.

The determined channel quality information may include a reference signal received power (RSRP). The determined channel quality information may include a reference signal received quality (RSRQ). The determined channel quality information may include a received signal strength indicator (RSSI). The determined channel quality information may include a channel quality indicator (CQI). The determined channel quality information may include a rank indicator (RI). The determined channel quality information may include a precoding matrix indicator (PMI).

For example, a WTRU may determine channel quality information (e.g., information associated with channel quality) based on one or more reference signals and/or resources received or transmitted within a narrowband. A first reference signal and/or resource may be received or transmitted within the narrowband. The first reference signal and/or resource may be referred to as NB-RS. A number of NB-RS ports (e.g., 1 or 2) may be determined and/or indicated in a broadcasting channel associated with the narrowband operation (e.g., a NB-MIB). The number of NB-RS ports may be indicated dynamically by an associated downlink control channel (e.g., a NB-PDCCH). A second reference signal and/or resource may be transmitted or received in a wider bandwidth than a narrowband. The second reference signal may be referred to as a legacy reference signal (e.g., CRS). The CRS within a narrowband may be used (e.g., only used) as a second reference signal. One or more parameters for CRS may be sent to a WTRU. The one or more parameters may include a narrowband location (e.g., relative to a center PRB index) information for CRS. The one or more parameters for CRS may include a scrambling sequence related information including cell-ID used for the scrambling sequence initialization. The second reference signal may use the same number of antenna ports as the first reference signal (e.g., based on an indication).

A first reference resource may be used for channel quality information measurement (e.g., if the first reference resource is available in the measurement resource).

A second reference resource may be used (e.g., with the first reference resource) for channel quality information measurement if the number of antenna ports for the first reference resource is the same as the number of antenna ports for the second reference resource. The second reference resource may be used (e.g., with the first reference resource) if a first cell-ID used for the scrambling sequence initialization for the first reference resource is the same as a second cell-ID used for the scrambling sequence initialization for the second reference resource.

An indicator may be signaled in a broadcasting channel. For example, the indicator may be a same-physical cell ID (PCI) indicator. The indicator may indicate whether the same cell-ID is used for a first reference resource and/or a second reference resource. If the indicator is set to TRUE, the cell-ID for the scrambling sequence initialization may be the same for one or more reference resources. If the indicator is set to TRUE, the number of antenna ports may be the same for the one or more reference resources. If the indicator is set to TRUE, the same transmission power may be assumed for the one or more reference resources. For example, a transmission power of each corresponding antenna port may be assumed (e.g., the transmission power of a first antenna port of a first reference resource and a second reference resource may be the same).

A WTRU may determine (e.g., assume) that a first antenna port of a first reference resource and a second antenna port of a second reference resource may be the same for channel quality information measurement.

A WTRU may indicate a capability of using one or more additional reference resources for demodulation and/or measurement. For example, the WTRU may indicate that a capability of supporting CRS based channel estimation as a second reference resource.

A WTRU may use a first reference resource and/or a second reference resource for demodulation. The WTRU may use the second reference resource and/or the first reference resource only for measurement.

The second reference resource may be used (e.g., only used) in a subset of operation modes. For example, the second reference resource may be used for demodulation and/or measurement in in-band operation mode. The second reference resource may be unavailable in one or more other operation modes (e.g., such as guard-band and stand-alone operation modes).

A first indicator (e.g., same-PCI indicator) may be used to indicate if a second reference resource may be used for demodulation and a second indicator may be used to indicate if a second reference resource may be used for measurement. If the first indicator is set to TRUE and the send indicator is set to FALSE, the second reference resource may be used for demodulation and the WTRU may determine to not use the second reference resource for purposes other than demodulation (e.g., channel quality measurements). If the first indicator is set to FALSE and the second indicator is set to TRUE, the second reference resource may be used for measurement. For example, if the first indicator is set to FALSE and the second indicator is set to TRUE, the second reference resource may be sued for measurement but not for other purposes such as demodulation. If both the first indicator and the second indicator are set to TRUE, the second reference resource may be used for demodulation and/or measurement. The first indicator and the second indicator may be the same indicator. The first indicator may be indicated via a broadcasting channel (e.g., NB-MIB). The second indicator may be indicated via a higher layer signaling (e.g., RRC signaling)

The NB-RS ports, NB-RS, NB reference signal, narrowband reference signal, and/or NB-RS antenna ports may be used interchangeably herein. The CRS ports, CRS, and/or CRS antenna ports may be used interchangeably herein.

A WTRU may use one or more reference resources for measurement of channel quality information based on an availability of the one or more reference resources in a time and/or frequency resource (e.g., measurement resource). For example, a measurement resource (e.g., a certain time/frequency resource) may be predetermined. A WTRU may perform a channel quality information measurement based on the availability of one or more reference resources within the measurement resource. The measurement resource may be predetermined as a certain subframe in a configured narrowband.

A first reference resource (e.g., a NB-RS) may be available if a NB-PDSCH is scheduled. The first reference resource may be available if a NB-PDCCH search space is configured within the measurement resource. The availability of the first reference resource may be determined based on the NB-PDSCH scheduling and/or the NB-PDCCH search space configuration.

A second reference resource (e.g., NB-Sync) may be available if a NB-Sync is transmitted within the measurement resource. The availability of the second reference resource may be determined based on the NB-Sync configuration.

A third reference resource (e.g., legacy reference signal, CRS) may be available within the measurement resource based on an operation mode.

If a first reference resource is not available in a measurement resource, a second reference resource may be used for measuring the channel quality information. If the second reference resource is a legacy reference signal (e.g., a CRS), the legacy reference signal in a PDCCH region (e.g., the first N symbols within a subframe) may be used in a first subset of subframes (e.g., potential MBSFN subframes). If the second reference resource is a legacy reference signal, the legacy reference signal in a subframe may be used in a second subset of subframes (e.g., non-MBSFN subframes). The first set of subframes (e.g., potential MBSFN subframes) may include subframes {1, 2, 3, 6, 7, 8} in a first frame structure (e.g., FDD) and/or subframes {3, 4, 7, 8, 9} in a second frame structure (e.g., TDD). The second subset of subframes (e.g., non-MBSFN subframes) may be the subframes not the potential MBSFN subframes.

The availability of one or more reference resources in a measurement resource may be indicated dynamically. For example, if a measurement reporting is triggered by an eNB, a NB-RS presence in the measurement resource may be indicated in triggering information.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed:

1. A wireless transmit/receive unit (WTRU) comprising:
a memory; and
a processor configured to:
receive a physical downlink shared channel (PDSCH) transmission;
receive downlink control information (DCI), wherein the DCI indicates a number of symbols to be used to transmit a hybrid automatic repeat request acknowledgment (HARQ-ACK) or a HARQ negative ACK (HARQ-NACK); and
determine to transmit HARQ information in response to the PDSCH transmission, wherein:
on a condition that the WTRU determines to transmit the HARQ-ACK, transmit a first signal using a first sequence, wherein the first signal is transmitted using the number of symbols indicated in the received DCI, wherein the first signal is transmitted in accordance with a first cyclic shift, and wherein the first cyclic shift indicates the HARQ-ACK; and
on a condition that the WTRU determines to transmit the HARQ-NACK, transmit a second signal using a second sequence, wherein the second signal is transmitted using the number of symbols indicated in the received DCI, wherein the second signal is transmitted in accordance with a second cyclic shift, and wherein the second cyclic shift indicates the HARQ-NACK.

2. The WTRU of claim 1, wherein the processor is configured to determine to transmit the HARQ-ACK when the PDSCH transmission is received correctly, and wherein the processor is configured to determine to transmit the HARQ-NACK when the PDSCH transmission is not correctly received.

3. The WTRU of claim 1, wherein the first sequence is derived in accordance with the first cyclic shift and a base sequence and the second sequence is derived in accordance with the second cyclic shift and the base sequence, and wherein the first cyclic shift is different than the second cyclic shift and the base sequence is a Zadoff-Chu sequence.

4. The WTRU of claim 1, wherein the PDSCH transmission is received in a first subframe and an uplink signal is transmitted in a second subframe.

5. The WTRU of claim 1, wherein the DCI indicates that the first cyclic shift is to be used for the HARQ-ACK and that the second cyclic shift is to be used for the HARQ-NACK.

6. The WTRU of claim 5, wherein the DCI indicates a cyclic shift group that comprises the first cyclic shift and the second cyclic shift.

7. The WTRU of claim 1, wherein a distance between the first cyclic shift and the second cyclic shift is 6.

8. The WTRU of claim 1, wherein the first sequence and the second sequence are the same.

9. The WTRU of claim 1, wherein the DCI indicates at least one of an index associated with the first cyclic shift, an index associated with the second cyclic shift, a first symbol associated with the first cyclic shift, or a first symbol associated with the second cyclic shift.

10. A method implemented by a wireless transmit/receive unit (WTRU) comprising:
receiving a physical downlink shared channel (PDSCH) transmission;
receiving downlink control information (DCI), wherein the DCI indicates a number of symbols to be used to transmit a hybrid automatic repeat request acknowledgment (HARQ-ACK) or a HARQ negative ACK (HARQ-NACK);
determining to transmit HARQ information in response to the PDSCH transmission, wherein:
on a condition that the WTRU determines to transmit the HARQ-ACK, transmitting a first signal using a first sequence, wherein the first signal is transmitted using the number of symbols indicated in the received DCI, wherein the first signal is transmitted in accordance with a first cyclic shift, and wherein the first cyclic shift indicates the HARQ-ACK; and
on a condition that the WTRU determines to transmit the HARQ-NACK, transmitting a second signal using a second sequence, wherein the second signal is transmitted using the number of symbols indicated in the received DCI, wherein the second signal is transmitted in accordance with a second cyclic shift, and wherein the second cyclic shift indicates the HARQ-NACK.

11. The method of claim 10, wherein the WTRU determines to transmit the HARQ-ACK when the PDSCH transmission is received correctly, and wherein the WTRU determines to transmit the HARQ-NACK when the PDSCH transmission is not correctly received.

12. The method of claim 10, wherein the first sequence is derived in accordance with the first cyclic shift and a base sequence and the second sequence is derived in accordance with the second cyclic shift and the base sequence, and wherein the first cyclic shift is different than the second cyclic shift, and the base sequence is a Zadoff-Chu sequence.

13. The method of claim 10, wherein the PDSCH transmission is received in a first subframe and an uplink signal is transmitted in a second subframe.

14. The method of claim 10, wherein the DCI indicates that the first cyclic shift is to be used for the HARQ-ACK and that the second cyclic shift is to be used for the HARQ-NACK.

15. The method of claim 10, wherein a distance between the first cyclic shift and the second cyclic shift is 6.

16. The method of claim 10, wherein the first sequence and the second sequence are the same.

17. The method of claim 10, wherein the DCI further indicates the DCI indicates at least one of an index associated with the first cyclic shift, an index associated with the second cyclic shift, a first symbol associated with the first cyclic shift, or a first symbol associated with the second cyclic shift.

* * * * *